(12) United States Patent  
Norris et al.

(10) Patent No.: US 12,163,786 B2  
(45) Date of Patent: Dec. 10, 2024

(54) CONSTRUCTION VERIFICATION SYSTEM, METHOD AND COMPUTER PROGRAM PRODUCT

(71) Applicant: CLEAREDGE3D, INC., Superior, CO (US)

(72) Inventors: James Norris, Mableton, GA (US); Michael Burenkov, Natick, MA (US); John Howard Sloan, IV, Broomfield, CO (US); George Kelly Cone, Jonestown, TX (US); Kevin Scott Williams, Glen Haven, CO (US)

(73) Assignee: CLEAREDGE3D, INC., Superior, CO (US)

( * ) Notice: Subject to any disclaimer, the term of this patent is extended or adjusted under 35 U.S.C. 154(b) by 452 days.

(21) Appl. No.: 17/539,913

(22) Filed: Dec. 1, 2021

(65) Prior Publication Data

US 2022/0170742 A1    Jun. 2, 2022

Related U.S. Application Data

(60) Provisional application No. 63/119,892, filed on Dec. 1, 2020.

(51) Int. Cl.
*G01C 15/00* (2006.01)
*G01C 15/06* (2006.01)
(Continued)

(52) U.S. Cl.
CPC .......... *G01C 15/004* (2013.01); *G01C 15/06* (2013.01); *G06F 30/12* (2020.01); *G06F 30/13* (2020.01);
(Continued)

(58) Field of Classification Search
None
See application file for complete search history.

(56) References Cited

U.S. PATENT DOCUMENTS

| 5,646,844 A * | 7/1997 | Gudat | G05D 1/0278 701/50 |
| 7,039,486 B2 * | 5/2006 | Wang | A41H 3/007 33/512 |

(Continued)

OTHER PUBLICATIONS

Oishi et al, T., "Fast Simultaneous Alignment of Multiple Range Images Using Index Images", Fifth International Conference on 3-D Digital Imaging and Modeling (3DIM'05), 2005. Retrieved on Jan. 25, 2022. Retrieved from <URL: https://ieeexplore.ieee.org/documenV1443281> entire document.

(Continued)

*Primary Examiner* — Luke D Ratcliffe

(74) *Attorney, Agent, or Firm* — Studebaker & Brackett PC

(57) ABSTRACT

A system includes a measurement device having an electronic distance measurement (EDM) instrument, and at least one processor coupled to the EDM instrument. The at least one processor is configured to localize the measurement device relative to a design model, the measurement device being physically located at a measurement location, automatically generate, for at least one design element in the design model, a plurality of sample directions, control the EDM instrument to automatically perform measurements in the plurality of sample directions, and generate and output a verification result indicating a relation between the at least one design element and at least one object corresponding to the at least one design element, based on a shape of the at least one design element and measurement data of the measurements.

20 Claims, 16 Drawing Sheets

(51) Int. Cl.
  *G06F 30/12* (2020.01)
  *G06F 30/13* (2020.01)
  *G06F 111/18* (2020.01)
  *G06T 17/20* (2006.01)
  *G06T 19/00* (2011.01)
  *G06T 19/20* (2011.01)
  *G06V 20/20* (2022.01)

(52) U.S. Cl.
  CPC ............ *G06T 17/20* (2013.01); *G06T 19/006* (2013.01); *G06T 19/20* (2013.01); *G06V 20/20* (2022.01); *G06F 2111/18* (2020.01)

(56) References Cited

U.S. PATENT DOCUMENTS

| | | | |
|---|---|---|---|
| 2012/0014564 A1* | 1/2012 | Jensen | G01S 7/51 382/106 |
| 2014/0067126 A1 | 3/2014 | Watanabe et al. | |
| 2014/0368378 A1* | 12/2014 | Crain | H01Q 15/14 342/25 A |
| 2015/0097828 A1* | 4/2015 | Miller | G01C 15/002 345/420 |
| 2015/0109509 A1 | 4/2015 | Di Federico et al. | |
| 2017/0307370 A1 | 10/2017 | Tanaka et al. | |
| 2018/0196135 A1 | 7/2018 | Crain et al. | |
| 2018/0251961 A1* | 9/2018 | France | B60R 1/24 |
| 2019/0347783 A1 | 11/2019 | Salgian et al. | |
| 2020/0327732 A1* | 10/2020 | Nichols | G06T 15/10 |
| 2020/0394837 A1* | 12/2020 | Hurd | G06T 7/521 |
| 2021/0056716 A1* | 2/2021 | Mörwald | G01C 15/002 |

OTHER PUBLICATIONS

International Search Report and Written Opinion issued in corresponding International Application No. PCT/US2021/072671, dated Feb. 10, 2022, pp. 1-10.

* cited by examiner

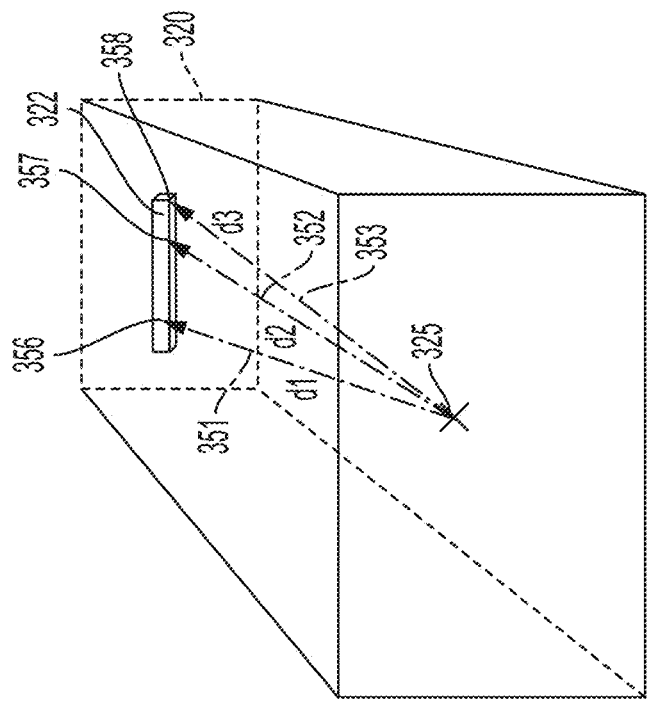
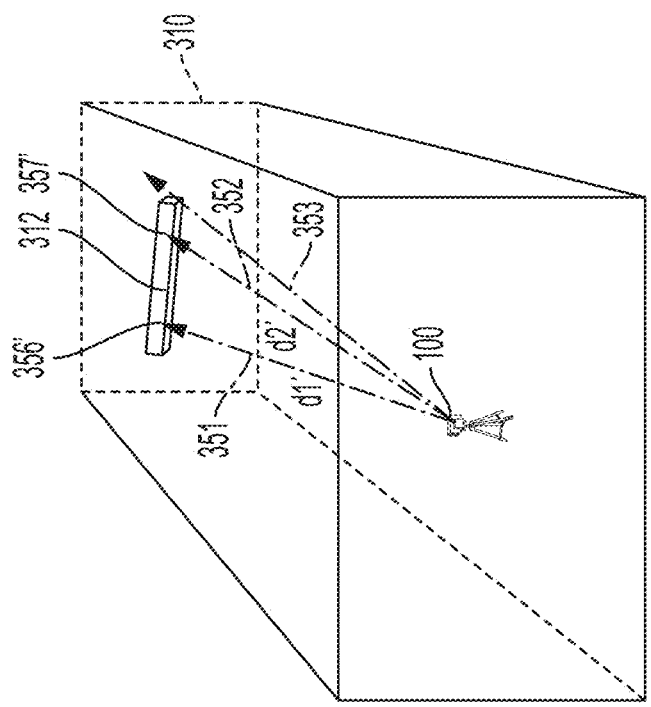
FIG. 3D

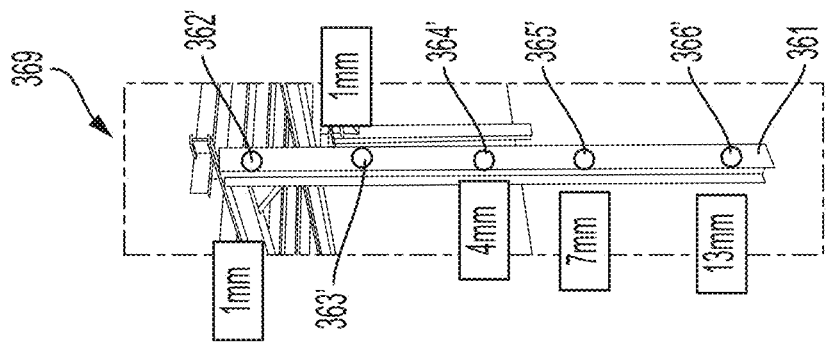
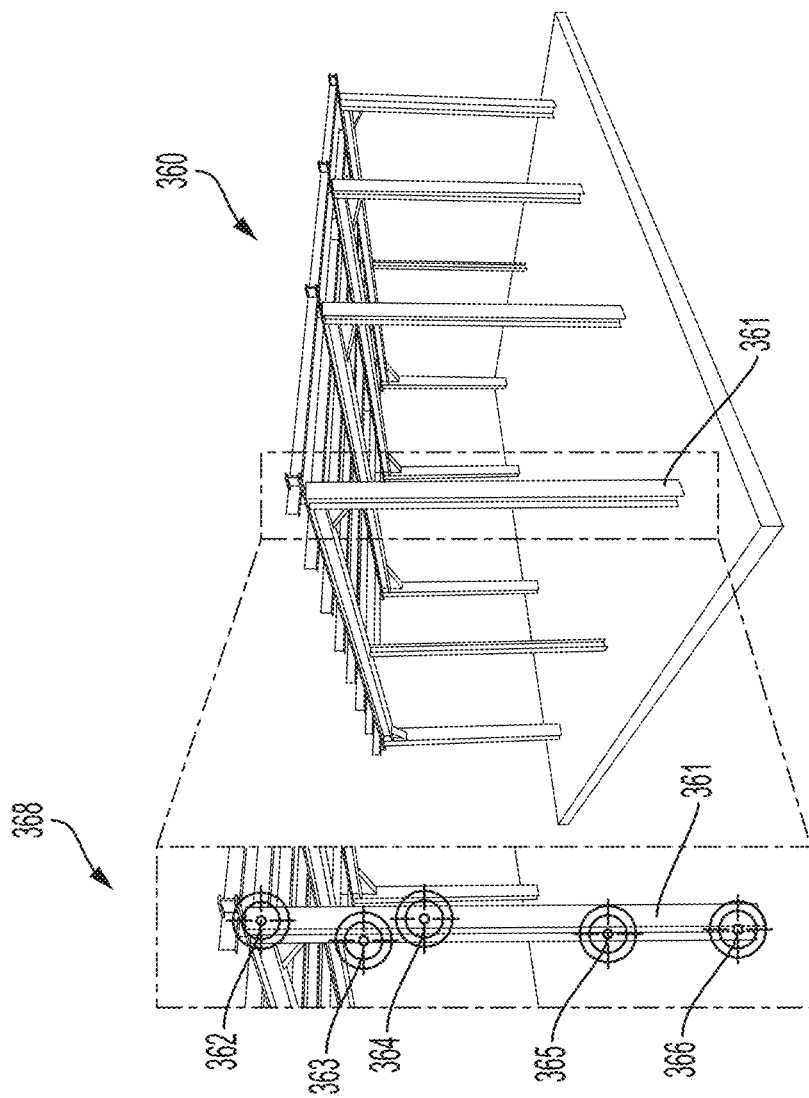
FIG. 3F

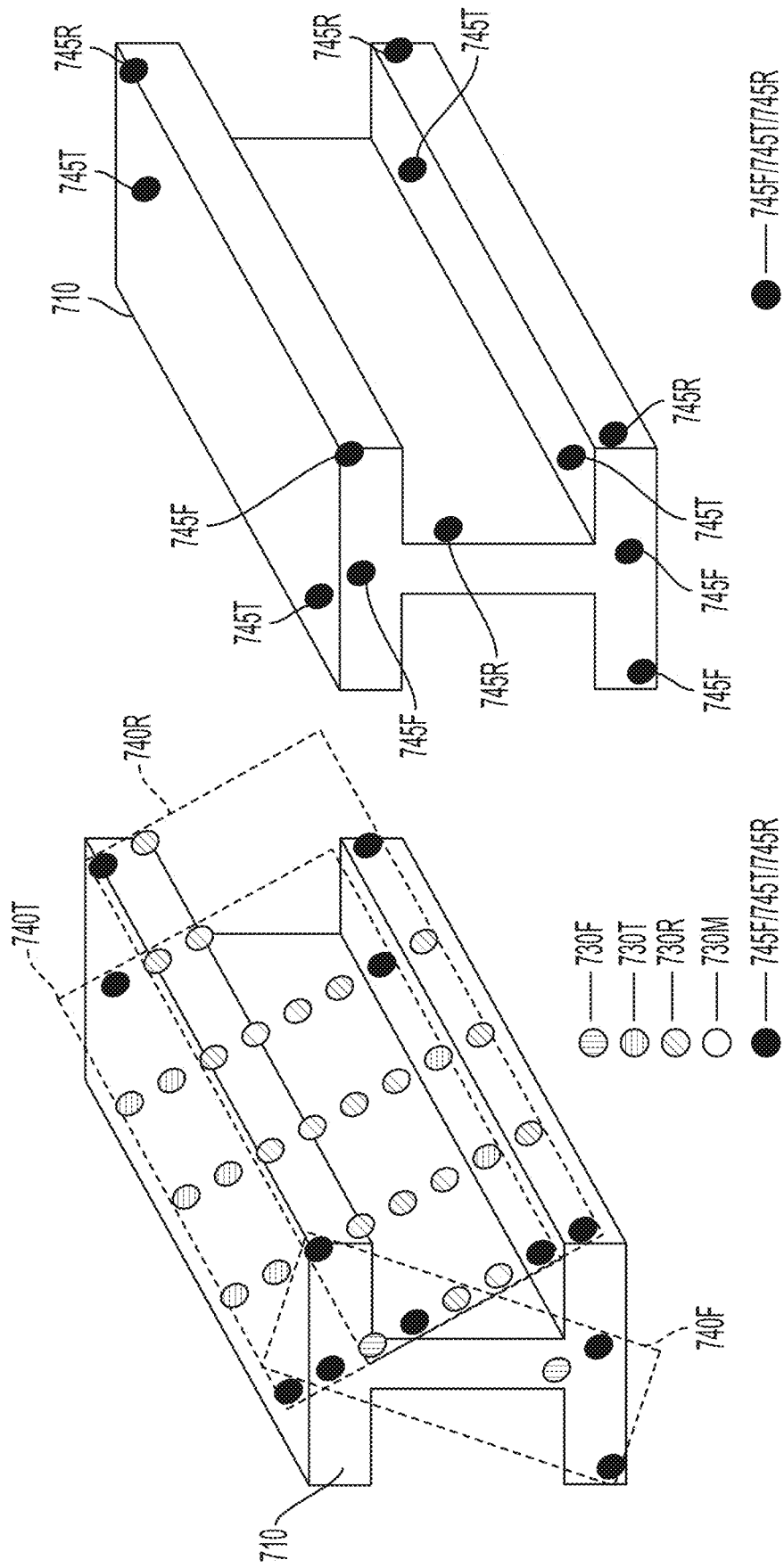

CONSTRUCTION VERIFICATION SYSTEM, METHOD AND COMPUTER PROGRAM PRODUCT

RELATED APPLICATION(S)

The present application claims the priority of U.S. Provisional Application No. 63/119,892, filed on Dec. 1, 2020, which is incorporated herein by reference in its entirety.

BACKGROUND

High-end building construction projects require very precise measurements to ensure proper construction. Some components often have acceptable installation errors under a quarter, an eighth, or even a sixteenth of an inch, and if these tolerances are not met, there may be undesirable consequences. Construction mistakes cost hundreds of billions of dollars every year. Thus, a verification system is used in construction to verify the accuracy of the physical placement of an as-built installation, elements or objects of an installation, relative to a design model of the installation.

BRIEF DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3D is a diagram schematically showing automatic measurements along sample directions, in accordance with some embodiments.

FIG. 3F is a diagram schematically showing a display of measurement data associated with a design element being verified, in accordance with some embodiments.

FIGS. 7A-7E are diagrams schematically showing various stages in an example for determining sample direction points and sample directions, in accordance with some embodiments.

DETAILED DESCRIPTION

Figure 1:
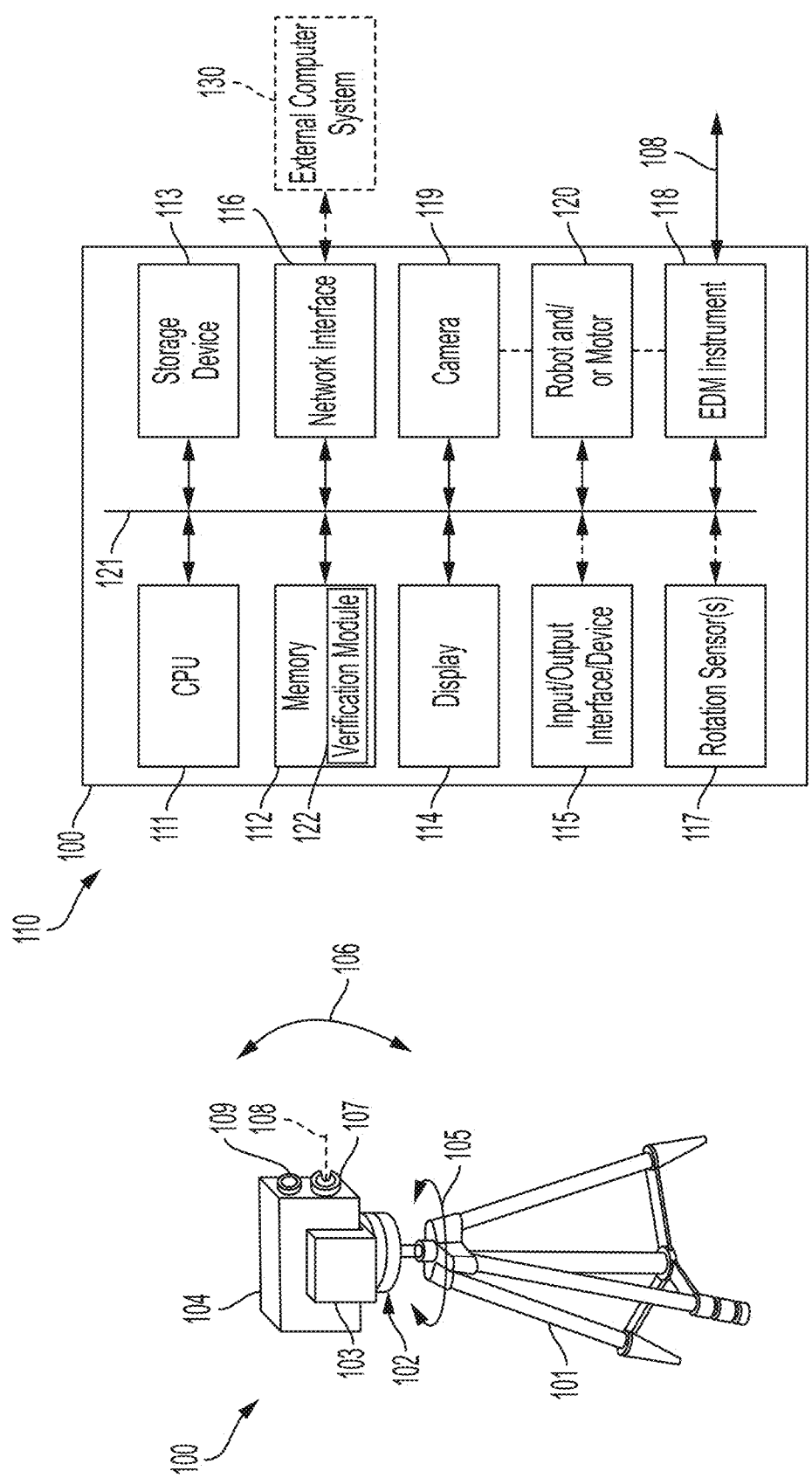
FIG. 1A is a schematic perspective view of a measurement device, in accordance with some embodiments.
FIG. 1B is a schematic block diagram of a verification system comprising a measurement device, in accordance with some embodiments.

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

One or more embodiments provide a method, a system, and/or a computer program product for use on a construction jobsite to verify the accuracy of the physical placement of an as-built installation (also referred to herein as "physical structure"), elements or objects of an installation, relative to a design model of the installation. In at least one embodiment, the method, a system, and/or a computer program product are used forensically to check a 3D model versus reality in an already built situation. Various features associated with some embodiments will now be set forth. Prior to such description, a glossary of terms applicable for at least some embodiments is provided.

Scene: According to some embodiments, a Scene (also referred to herein as "scene") includes or refers to the set of physical, visible objects in the area where a measurement device is to be used, along with each object's location. For instance, the Scene inside a library would include the walls, windows, bookshelves, books, and desks, i.e., physical objects that are visible within that library.

Object: According to some embodiments, an Object (also referred to herein as "object" or "as-built object") is a physical element in a scene. In some embodiments, an object is installed or constructed during construction. Examples of objects include, but are not limited to, an I-beam, a pipe, a wall, a duct, a door, or the like.

Virtual Model: According to some embodiments, a Virtual Model (also referred to herein as "virtual model") is a digital representation of one or more physical objects that describes the geometry of those objects. In some embodiments, a Virtual Model is a two-dimensional (2D) or a three-dimensional (3D) drawing. In some embodiments, a Virtual Model is a collection of one or more faces that describe the boundary or a portion of the boundary of a set of one or more objects. For example, a Virtual Model that contains the top and bottom faces of a cube would be a Virtual Model that describes a portion of the boundary of the cube. Similarly, a Virtual Model that contains all six faces of a cube would be a 3D model that describes the entire boundary of the cube. In at least one embodiment, a Virtual Model may present objects in one or more formats, including, but not limited to, Computer Assisted Design (CAD), Boundary Representation (B-Rep), Constructive Solid Geometry (CSG), Building Information Modeling (BIM), 2D drawings, or the like. A Virtual Model may also comprise a polygonal mesh used to represent all, or a portion of, one or more objects. A Virtual Model may also be a digital volumetric representation of one or more physical objects, such as an occupancy grid map or a polyhedral mesh. A digital representation of geometry may comprise the Virtual Model.

Scene Model: According to some embodiments, a Scene Model (also referred to herein as "scene model") is a Virtual Model that describes the geometry of a Scene. In at least one embodiment, the Scene Model accurately reflects the shape and physical dimensions of the Scene and accurately reflects the positions of objects visible in that scene.

Design Model: According to some embodiments, a Design Model (also referred to herein as "design model") is a Virtual Model that describes the geometry of a physical structure to be constructed or installed in a scene. For example, a Design Model of a simple square room may include digital representations of four walls, a floor, and a ceiling—all to scale and accurately depicting the designer's intent for how the building is to be constructed. According to some embodiments, the Design Model exists in the same working coordinate system as the Scene Model.

Design Element: According to some embodiments, a Design Element (also referred to herein as "design element" or "as-designed object") is at least a portion of a Design Model and describes the geometry of a corresponding Object (or "as-built object") in the physical structure corresponding to the Design Model.

In one or more embodiments, a Scene comprises one or more physical structures. Each physical structure comprises one or more Objects (or as-built objects), and is installed or constructed in accordance with a corresponding Design Model. The Design Model comprises one or more Design Elements. Each Design Element is an as-designed object corresponding to an as-built object in the physical structure. In at least one embodiment, multiple Objects coupled to each other in a physical structure are verified as a single Object, and the corresponding multiple Design Elements in the corresponding Design Model are considered together as a single Design Element to verify the single Object. A particular, non-limiting example of a physical structure, objects, a corresponding design model, and corresponding design elements is described with respect to FIG. 3F.

Localization (or Localizing): According to some embodiments, Localization (also referred to herein as "localization") of a measurement device refers to the process of determining the 2D or 3D location (also referred to herein as "virtual device location") of that measurement device according to a working coordinate system used by the Scene Model or Design Model. The working coordinate system may be any coordinate system usable to describe as-designed objects in the Scene Model or Design Model. In at least one embodiment, the working coordinate system is different from a pre-defined coordinate system in which the scene model or design model is expressed when the scene model or design model is generated and/or loaded. For example, the pre-defined coordinate system is a Cartesian coordinate system, whereas the working coordinate system is a spherical coordinate system or a Cartesian coordinate system having the origin shifted from the origin of the pre-defined Cartesian coordinate system. In at least one embodiment, more than one working coordinate system may be used. In at least one embodiment, the working coordinate system is the same as the pre-defined coordinate system.

Measurement Data: According to some embodiments, Measurement Data (also referred to herein as "measurement data") refers to data obtained by the measurement device performing one or more measurements.

Data Interface: According to some embodiments, a Data Interface (also referred to herein as "data interface") includes a portion of a computer system that allows data to be loaded onto and/or from a computer system. In some embodiments, a network interface operates as a data interface, allowing data to be loaded across a wired or wireless network. In some embodiments, an input/output interface or device operates as a data interface. In some embodiments, a removable memory device or removable memory media operates as a data interface, allowing data to be loaded by attaching the device or by loading the media. In some embodiments, data are pre-loaded into a storage device, e.g., a hard disk, in the computer system, and the storage device operates as a data interface. This list of example embodiments is not exclusive; other forms of a data interface appear in further embodiments.

Total Station: According to some embodiments, a total station is a device that can be directed to perform an electronic distance measurement (EDM) in a particular measurement direction and return the measurement result. In some embodiments, the measurement result comprises angular orientation of the measurement direction, and a distance from the total station to a measured point in the measurement direction.

In some embodiments, a measurement device is localized relative to a design model. A design element in the design model is selected for verification. A plurality of sample directions is automatically generated for the selected design element. The measurement device is controlled to automatically perform measurements (also referred to herein as "shoot") in the sample directions and collect measurement data of the measurements. Based on the measurement data, it is verified whether an as-built object corresponding to the selected design element is correctly installed or not. An as-built object is incorrectly installed when a difference in location and/or orientation between the as-built object and the corresponding as-designed object is greater than a corresponding predetermined acceptable installation error. In some embodiments, an acceptable installation error or tolerance covers both a location error related to deviations between locations of the as-built object and the as-designed object, and a shape error related to deviations between shapes of the as-built object and the as-designed object. In some embodiments, a user is provided with one or more options for customizing the verification process, including, but not limited to, rough alignment between the corresponding as-designed object and as-built object, modification of one or more sample directions, manual shooting to improve verification accuracy, selectable algorithms and/or approaches for generating or determining sample directions, selectable algorithms and/or approaches for matching or mapping corresponding as-designed and as-built objects, verifying the same as-built object from multiple measurement locations, or the like.

In at least one embodiment, the measurement device is an electronic distance measurement (EDM) device, such as a total station. Other approaches use advanced surveying instruments, such as laser scanners, or the like. A typical laser scanner generates point cloud data by rapidly rotating the laser beam direction in a pattern, while performing thousands, even millions, of measurements which are distributed across the whole scene. This excessive amount of data requires increased computing workload and/or processing time. A laser scanner is an expensive instrument that requires a very specialized, skilled operator, and is rarely used on construction projects. Total stations, to the contrary, make a single distance measurement in a shooting direction and measurements can be directed by a user. A beam steering mechanism is utilized to point the beam of the total station in a specified direction, or in a set of specified directions. A total station typically costs about half the cost of a laser scanner. Using a total station requires a skilled operator but the skillset required is relatively common on construction sites where total stations are ubiquitous tools. As a result, in at least one embodiment, by using an EDM device such as a total station for construction verifications, it is possible to achieve high accuracy verifications with far fewer measurements, less processing time, lower computing requirements, than other approaches that use laser scanners.

Further approaches that use total stations for construction verifications involve a manual process of reading coordinates of an identifiable point from a model, manually aiming and shooting a corresponding point on site, and computing a difference to detect installation errors. Typically, one object is verifiable at a time. Such a process is slow, error-prone and does not cover rotational installation errors. To the contrary, in at least one embodiment using an EDM device such as a total station for construction verifications, the process is fully automated with the total station being controlled to automatically aim and shoot, and the collected measurement data are automatically processed to report the accuracy, or lack thereof, of the installation. As a result, in one or more embodiments, the verification process is fast, provides full 3D reports on translation and rotation, and makes it possible to batch-process multiple objects at once. One or more other advantages of some embodiments are further described herein.

FIG. 1A is a schematic perspective view of a measurement device 100, in accordance with some embodiments. In at least one embodiment, the measurement device 100 comprises a total station.

The measurement device 100 comprises a support 101, a base 102 rotatably supported on the support 101, a bracket 103 on the base 102, and a housing 104 rotatably supported by the bracket 103. In the example configuration in FIG. 1A, the support 101 comprises a tripod. Other support configurations are within the scopes of various embodiments. The base 102 is supported on the support 101 to be rotatable about a vertical axis, as shown by an arrow 105. In some embodiments, the base 102 is rotatable by a full 360 degrees. The bracket 103 is, for example, a U-shaped bracket. The housing 104 is supported by the bracket 103 to be rotatable about a horizontal axis, as shown by an arrow 106. The housing 104 accommodates therein or supports various components of the measurement device 100, as described with respect to FIG. 1B. The housing 104 comprises an opening or transparent cover or lens 107 through which a measurement signal is emitted and a returned measurement signal is received along a measurement direction (also referred to herein as "shooting direction") 108. The shooting direction 108 is controlled and determined by the rotation of the base 102 about the vertical axis and/or the rotation of the housing 104 about the horizontal axis. The housing 104 comprises an opening or transparent cover or lens 109 through which a camera (described with respect to FIG. 1B) in the housing 104 captures an image in the shooting direction 108.

FIG. 1B is a schematic block diagram of a verification system 110 comprising the measurement device 100, in accordance with some embodiments. In some embodiments, the measurement device 100 alone defines the verification system 110. In at least one embodiment, the verification system 110 comprises the measurement device 100 and an external computer system 130 coupled to the measurement device 100.

In the example configuration in FIG. 1B, the measurement device 100 comprises a computer system including a hardware central processing unit (CPU) or processor or controller 111, a memory 112, a storage device 113, a display 114, one or more input/output (I/O) interfaces or devices 115, a network interface 116, one or more rotation sensors 117, an EDM instrument 118, a camera 119, and a robot and/or motor 120, which are coupled with each other by a bus 121. In some embodiments, the described components of the measurement device 100 are accommodated in or supported by the housing 104, and move together with the housing 104.

In some embodiments, the CPU 111 processes information and/or instructions, e.g., stored in memory 112 and/or storage device 113. In some embodiments, the CPU 111 comprises one or more individual processing units. In one or more embodiments, CPU 111 is a distributed processing system, an application specific integrated circuit (ASIC), and/or a suitable processing unit. In one or more embodiments, a portion or all of the described processes and/or methods and/or operations, is implemented in two or more computer systems and/or by two or more processors or CPUs 111.

In some embodiments, the memory 112 and/or storage device 113 includes a non-transitory, computer readable, storage medium. In some embodiments, the memory 112 and/or storage device 113 includes a volatile and/or a non-volatile computer readable storage medium. Examples of the memory 112 and/or storage device 113 include, but are not limited to, electronic, magnetic, optical, electromagnetic, infrared, and/or a semiconductor system (or apparatus or device), such as a semiconductor or solid-state memory, a magnetic tape, a removable computer diskette, a random access memory (RAM), a read-only memory (ROM), a rigid magnetic disk (hard disk driver or HDD), a solid-state drive (SSD), and/or an optical disk. In some embodiments, memory 112 stores a set of instructions to be executed by the CPU 111. In some embodiments, memory 112 is also used for storing temporary variables or other intermediate information during execution of instructions to be executed by the CPU 111. In some embodiments, the instructions for causing CPU 111 to perform one or more of the described steps, operations, methods, and/or tasks may be located in memory 112. In some embodiments, these instructions may alternatively be loaded from a disk (e.g., the storage device 113) and/or retrieved from a remote networked location. In some embodiments, the instructions reside on a server, and are accessible and/or downloadable from the server via a data connection with the data interface. In some embodiments, the data connection may include a wired or wireless communication path established with the Internet, for example.

In some embodiments, the memory 112 includes one or more executable modules to implement operations described herein. In some embodiments, the memory 112 includes a verification module 122. In some embodiments, the verification module 122 includes software or executable instructions for causing one or more processors, such as the CPU 111, to perform one or more operations, methods, and/or tasks described with respect to a construction verification process described herein. In some embodiments, the verification module 122 is stored in and executed by the external computer system 130. Examples of such operations, methods, and/or tasks are discussed in greater detail below, e.g., in connection with one or more of FIGS. 2-7E. It should be noted that the verification module 122 is provided by way of example. In some embodiments, additional modules, such as an operating system or graphical user interface module are also included. It should be appreciated that the functions of the modules may be combined. In addition, the functions of the modules need not be performed on a single measurement device. Instead, the functions may be distributed across a network, if desired. Indeed, some embodiments are implemented in a client-server environment with various components being implemented at the client-side and/or server-side.

In some embodiments, the memory 112 and/or storage device 113 comprises a static and/or a dynamic memory storage device such as a flash drive, SSD, memory card, hard drive, optical and/or magnetic drive, and similar storage devices for storing information and/or instructions. In some embodiments, a static and/or dynamic memory 112 and/or storage device 113 storing media is configured to be removably connected with the measurement device 100. In some embodiments, data describing a Design Model are received by loading a removable medium (such as storage device 113) onto memory 112, or by attaching a removable static and/or dynamic memory 112 and/or storage device 113, such as a flash drive, SSD, memory card, hard drive, optical, and/or magnetic drive, or the like, to the measurement device 100. In some embodiments, Measurement Data are received from the EDM instrument 118 via the bus 121, as illustrated in FIG. 1B. In at least one embodiment, Measurement Data are received from the EDM instrument 118 through network interface 116 or input/output interfaces or devices 115.

Examples of the display 114 include, but are not limited to, a liquid crystal display (LCD), cathode ray tube (CRT), a touch screen, or other display technology, for displaying information to a user. In some embodiments, a display 114 is not included as a part of measurement device 100. In some embodiments, the measurement device 100 is configured to be removably connected with a display 114.

Examples of input/output interfaces or devices 115 include, but are not limited to, a keyboard, keypad, mouse, trackball, trackpad, touchscreen, and/or cursor direction keys for communicating information and commands to CPU 111.

The network interface 116 comprises circuitry and provides connectivity to a network (not shown), thereby allowing the measurement device 100 to operate in a networked environment, e.g., by communicating with the external computer system 130. In some embodiments, measurement device 100 is configured to receive data and/or instructions through the network interface 116 and/or the input/output interfaces or devices 115. In some embodiments, network interface 116 includes one or more wireless network interfaces such as BLUETOOTH, WIFI, WIMAX, GPRS, LTE, 5G, or WCDMA; and/or one or more wired network interfaces such as ETHERNET, USB, or IEEE-1364.

The rotation sensors 117 are configured to detect angular positions of the base 102 and housing 104 in their respective rotations. The angular positions detected by the rotation sensors 117 uniquely identify the shooting direction 108 in the 3D space. Examples of the rotation sensors 117 include, but are not limited to, acceleration sensors, rotary detector, or the like. In at least one embodiment, the measurement device 100 further comprises one or more other sensors including, but not limited to, echolocation sensor (e.g., a sonar device) a Global Positioning System (GPS) receiver, an Inertial Measurement Unit (IMU), a compass, an altimeter, a gyroscope, or the like.

The EDM instrument 118 is configured to measure a distance between the measurement device 100 and an object in the shooting direction 108. In at least one embodiment, the EDM instrument 118 comprises a signal source for emitting a measurement signal along the shooting direction 108, and a signal sensor for detecting the returned measurement signal reflected off an object. A distance from the measurement device 100 to the object is determined by the EDM instrument 118 itself or by a processor, such as the CPU 111, based on the flight time and speed of the measurement signal. In some embodiments, the measurement signal comprises laser light, and the EDM instrument 118 comprises a laser light source and an optical sensor. Measurement signals other than laser are within the scopes of various embodiments. EDMs based on principles other than measurement signal flight time are within the scopes of various embodiments.

The camera 119 is configured to capture an image in the shooting direction 108, as described with respect to FIG. 1A. In the example configuration in FIG. 1A, an optical axis of the lens 109 of the camera 119 is offset relative to the shooting direction 108 of the EDM instrument 118, potentially resulting in parallax. Additionally or alternatively, the camera 119 might have a wide-angle or "fish-eye" lens, introducing visual distortions in the image captured by the camera 119. In the case of parallax and/or distortion, an Augmented Reality (AR) rendering of the design element, for example, as described with respect to FIG. 3B, can be computed/distorted to match the distortions in the image captured by the camera 119. Additionally or alternatively, the image captured by the camera 119 can be processed to remove the distortions. In some embodiments, the camera 119 is configured to be coaxial with the shooting direction 108 of the EDM instrument 118 to avoid parallax. Examples of camera 119 include, but are not limited to, charge-coupled device (CCD) image sensor, complementary metal oxide semiconductor (CMOS) image sensor, or the like. In at least one embodiment, the camera 119 is omitted from the measurement device 100.

The robot and/or motor 120 is configured to orient the shooting direction 108 to a direction instructed by a processor, such as the CPU 111. For example, the robot and/or motor 120 could cause the base 102 to rotate relative to the support 101 and/or cause the housing 104 to rotate relative to the bracket 103, in accordance with instructions about a sample direction provided from the CPU 111. When the shooting direction 108 arrives at the sample direction instructed by the CPU 111, the robot and/or motor 120 stops the described rotations and the EDM instrument 118 and/or the camera 119 are controlled to perform a measurement and/or capture an image. In some embodiments, a combination of the robot and/or motor 120 and the rotational supports with the base 102, bracket 103 and housing 104 is referred to as a beam steering mechanism. Additionally or alternatively, the shooting direction 108 is optically controlled or steered by moving one or more optical components, such as mirrors, prisms, or the like, in an optical system of the EDM instrument 118. Additionally or alternatively, the shooting direction 108 is electronically controlled or steered, for example by changing the relative phase of a plurality of laser emitters, which in some embodiments is referred to as a phased array. An angular orientation of the shooting direction 108 in the real world space is determined by the rotation angles of the base 102, bracket 103 and/or housing 104, and/or by the optical steering in the EDM instrument 118 and/or by the electronic steering in the EDM instrument 118. In some embodiments, the angular orientation of the shooting direction 108 is included in a measurement result output by the EDM instrument 118.

The bus 121 or another similar communication mechanism transfers information between the components of the measurement device 100, such as CPU 111, memory 112, storage device 113, display 114, input/output interfaces or devices 115, network interface 116, rotation sensors 117, EDM instrument 118, camera 119, and robot and/or motor 120. In some embodiments, information is transferred between some of the components of the measurement device 100 or within components of the measurement device 100 via a communications network, such as a wired or wireless communication path established with the Internet, for example.

The external computer system 130 comprises a computer system similar to that described with respect to the measurement device 100. In at least one embodiment, the external computer system 130 comprises at least a processor, a memory, and a network interface or I/O device. Examples of the external computer system 130 include, but are not limited to, a laptop, a tablet, a smart phone, or the like. In some embodiments, one or more or all of CPU operations described herein, such as calculations, determinations, controls, or the like, are performed by the CPU 111, a CPU of the external computer system 130, or both. In some embodiments, one or more or all of display operations described herein are performed by the display 114, a display of the external computer system 130, or both. In some embodiments, one or more or all of I/O operations, e.g., for receiving user input, as described herein, are performed by the input/output interface or device 115, an input/output interface or device of the external computer system 130, or both.

As described herein, in at least one embodiment, the measurement device 100 comprises a total station. In at least one embodiment, a total station or a total station theodolite is an electronic/optical instrument used for surveying and verifying building construction. In one or more embodiments, a total station comprises an electronic transit theodolite integrated with an electronic distance meter (e.g., an EDM instrument) to measure both vertical and horizontal angles and the slope distance from the instrument to a particular point, and an on-board computer to collect data and perform triangulation calculations. In one or more embodiments, robotic or motorized total stations allow the operator to control the instrument from a distance via remote control. This eliminates the need for an assistant staff member as the operator holds a retroreflector and controls the instrument from the observed point. In some embodiments, motorized total stations can also be used in automated setups known as an Automated Motorized Total Station. Other configurations for the measurement device 100 are within the scopes of various embodiments, provided that the measurement device 100 is configured to perform measurements in a specific shooting direction controllable by software or an operator. This is in contrast to laser scanners which scan and capture measurement data in a wide range of directions.

Figure 2:
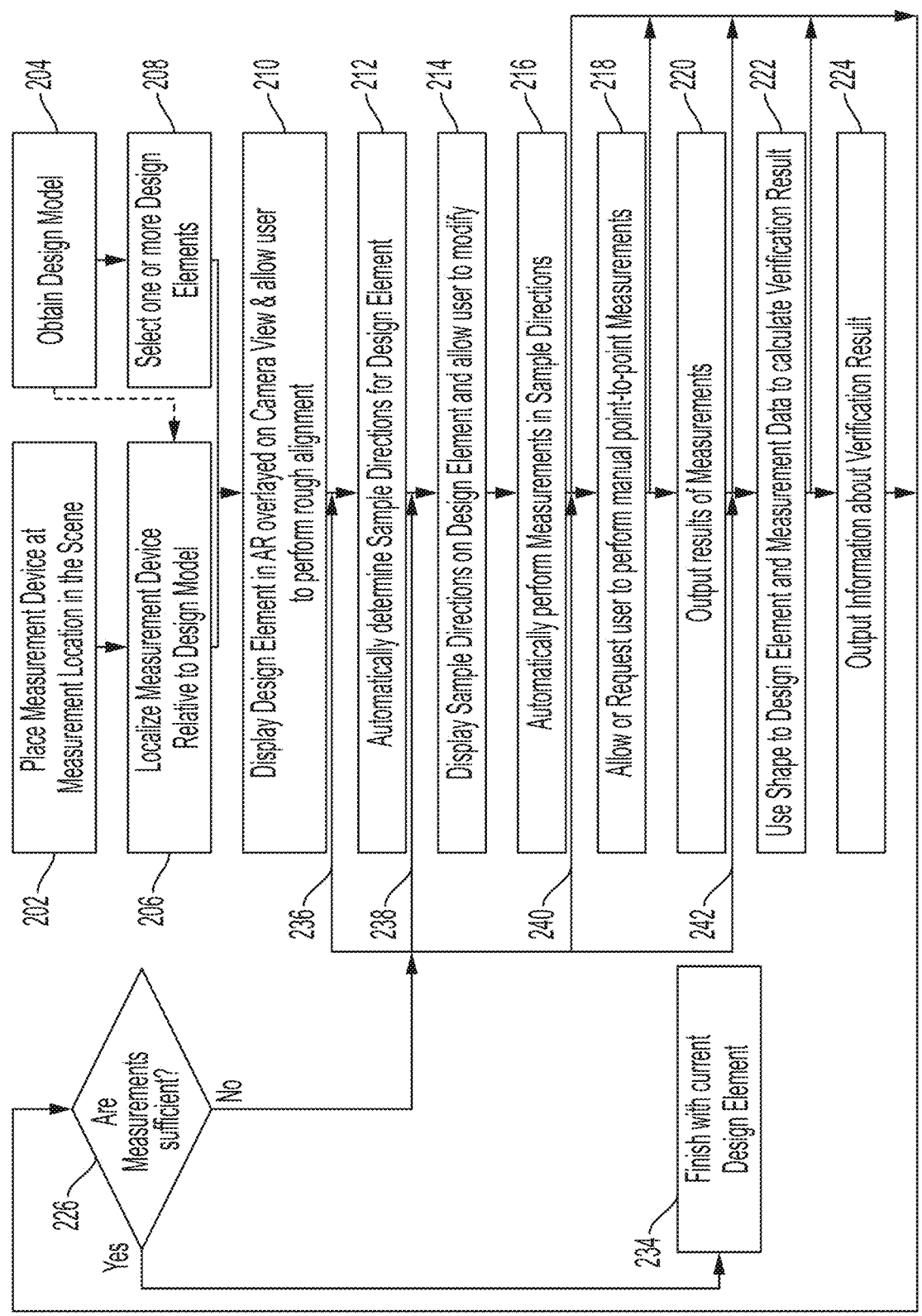
FIG. 2 is a flowchart of a verification method using a measurement device, in accordance with some embodiments.

FIG. 2 is a flowchart of a verification method 200 using a measurement device, in accordance with some embodiments. In some embodiments, the measurement device 100 is used in the verification method 200, alone or in cooperation with the external computer system 130. For example, some or all of the operations of the verification method 200 in FIG. 2 correspond to computer-executable instructions, such as the verification module 122, stored in a memory and/or storage device for execution by at least one processor, such as CPU 111 and/or a processor of the external computer system 130. The order of operations of the verification method 200 in FIG. 2 is an example. In some embodiments, the operations in the verification method 200 are not necessarily required to be performed in the order shown in FIG. 2. In at least one embodiment, one or more operations in the verification method 200 may be added, replaced, changed order, and/or eliminated. In at least one embodiment, a verification process for a design element and the corresponding object comprises at least operations 212, 216, 222 and 224. Various operations in the verification method 200 are described with respect to one or more of FIGS. 3A-3G.

At operation 202, the measurement device is placed at a measurement location in a scene. For example, the measurement device 100 is brought to a scene, e.g., a construction jobsite which includes a physical structure with an object to be verified. The measurement device 100 is placed at a measurement location in the scene where the shooting direction 108 of the EDM instrument 118 is rotatable to face the physical structure with the object to be verified. In some embodiments, the measurement location is a point having a known location or coordinates, referred to herein as "control point." In at least one embodiment, the control point was previously determined and marked at the scene. In at least one embodiment, the known location is the absolute location of the initial point relative to the Earth's surface. In one or more embodiments, the measurement location is an arbitrary location at the scene and coordinates of the measurement device 100 at the measurement location are determined during localization, as described herein.

At operation 204, a design model is obtained, for example, by a processor. For example, the processor of the measurement device 100 and/or the processor of the external computer system 130 (hereinafter, collectively referred to as "the processor") receives, through a data interface, data describing a design model. In some embodiments, the processor receives, through a data interface, a scene model comprising a set of design models including the design model to be used for verification. The scene model or design model may be loaded, as a data file, onto a measurement device 100 through a network interface 116 and stored in memory 112 and/or storage device 113 as illustrated in FIG. 1B. As another example, in some embodiments, an optical storage disk or another removable medium containing a scene model or design model is placed in an optical disk drive or a corresponding reader. In some embodiments, the scene model or design model may be a CAD design, a B-Rep model, a BIM design, a 2D drawing, or the like. In some embodiments, operation 204 of obtaining the design model is performed before operation 202 of placing the measurement device at the scene.

At operation 206, the measurement device physically placed at the scene at operation 202 is localized relative to the scene model obtained at operation 204. A dot-dot arrow from operation 204 to operation 206 is illustrated in FIG. 2 to schematically show that the design model obtained at operation 204 is used in the localization at operation 206. In some embodiments, localization of the measurement device 100 relative to the design model comprises determining a virtual device location of the measurement device in the design model, as described with respect to FIG. 3A.

Figure 3A:
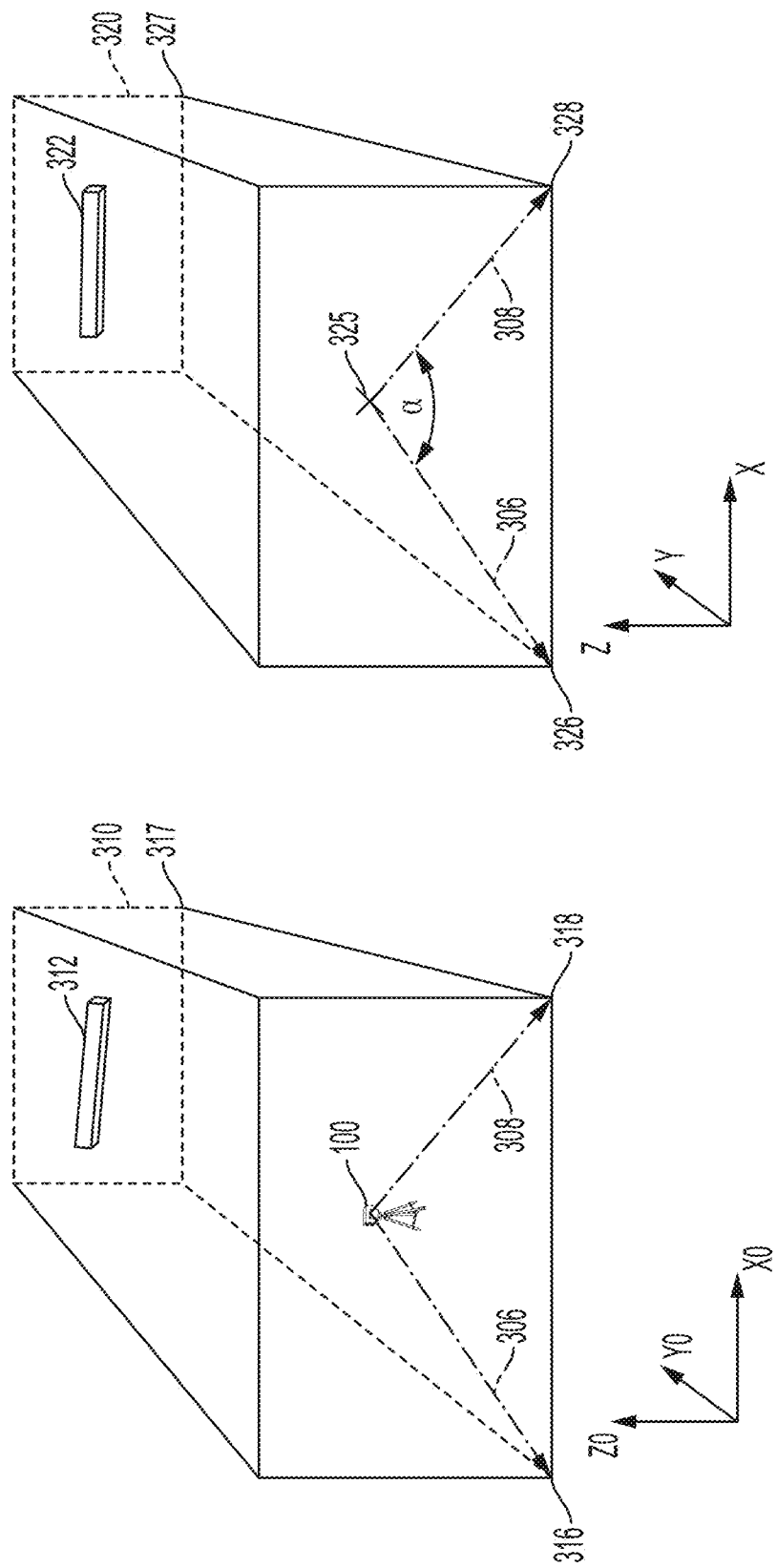
FIG. 3A is a diagram schematically showing a measurement device in a scene and in a design model, in accordance with some embodiments.

FIG. 3A is a diagram schematically showing the measurement device 100 physically placed in a scene 310, and localized in a design model 320, in accordance with some embodiments. The scene 310 comprises an as-built object 312 to be verified. In some embodiments, the object 312 is an object in a physical structure at the scene 310. For simplicity, other objects of the physical structure are omitted in FIG. 3A. The physical structure is built or installed or constructed in accordance with the design model 320. The design model 320 comprises an as-designed object, or design element, 322 corresponding to the object 312. For simplicity, other design elements in the design model 320 are omitted in FIG. 3A. FIG. 3A illustrates an example situation in which the as-built object 312 does not completely match the design element 322.

In some embodiments, localizing the measurement device relative to the design model means that the measurement device and the design model are in a common working coordinate system which can be any working coordinate system, e.g., a working coordinate system X-Y-Z of the design model 320, a working coordinate system X0-Y0-Z0 of the measurement device 100 (or the scene 310), or another working coordinate system. In an example, the measurement device is localized in the working coordinate system of the design model. In another example, the design model is localized in the working coordinate system of the measurement device. A person of ordinary skill in the art would understand that these two scenarios are mathematically equivalent, with the transform to localize the design model in the working coordinate system of the measurement device simply being the inverse of the transform to localize the measurement device in the working coordinate system of the design model. For simplicity, example embodiments are described herein for a situation where the measurement device is localized in the working coordinate system of the design model. The localization in this situation comprises determining a virtual device location 325 of the measurement device 100 in the working coordinate system X-Y-Z of the design model 320.

In an example localization operation, the measurement device 100 is placed at a control point and is controlled to shoot (i.e., perform measurements of) another control point. In some embodiments, a survey rod, which comprises a pole with a prism on top, is placed at the other control point, and the measurement device 100 is controlled to shoot the prism and then the measurement result is corrected, e.g., by the processor, for the height of the prism on the rod. When the measurement device 100 is placed at a control point having known coordinates in the real world, i.e., in the working coordinate system X0-Y0-Z0 of the scene 310, the location of the measurement device 100 in the working coordinate system X0-Y0-Z0 of the scene 310 is known, i.e., the measurement device 100 is localized relative to the working coordinate system X0-Y0-Z0 of the scene 310. The design model 320 is also localized relative to the working coordinate system X0-Y0-Z0 of the scene 310 by using points with known coordinates in both the working coordinate system X0-Y0-Z0 of the scene 310 and the working coordinate system X-Y-Z of the design model 320. For example, assuming that the scene 310 is a room and the design model 320 is the virtual model of the room, corners 326, 327, 328 with known coordinates in the working coordinate system X-Y-Z of the design model 320 are mapped to corresponding corners 316, 317, 318 with known coordinates in the working coordinate system X0-Y0-Z0 of the scene 310. By converting coordinates of the real world working coordinate system X0-Y0-Z0 to corresponding coordinates of the working coordinate system X-Y-Z of the design model 320, or vice versa, it is possible to determine the virtual device location 325 of the measurement device 100 in the design model 320.

In addition, an orientation (also referred to as "angular pose," "angular orientation," or "rotational orientation") of the measurement device 100 is also determined relative to the design model 320. For example, the measurement device 100 is controlled by the processor, or by a user, to shoot a point, e.g., corner 316 or 318, with known coordinates in the working coordinate system X0-Y0-Z0 of the scene 310 and corresponding known coordinates (e.g., corner 326 or 328) in the working coordinate system X-Y-Z of the design model 320. When the measurement device 100 is controlled to shoot the corner 316 (or 318), the angular orientation of the measurement direction 306 (or 308) between the measurement device 100 and the corner 316 (or 318) is the same as the angular orientation of the direction between the corresponding virtual device location 325 and the corresponding corner 326 (or 328), and is used to determine the orientation of the measurement device 100 relative to the design model 320. In some embodiments, shooting one control point (e.g., one of three corners 316, 317, 318) is sufficient to obtain the full 3D angular pose of the measurement device 100 (which itself is placed over a control point), when the measurement device 100 is levelled, e.g., by using a physical and/or digital bubble, so that the "up" direction of the measurement device 100 is aligned with the z-axis direction (vertical direction). In at least one embodiment, shooting two control points (e.g., two out of three corners 316, 317, 318) is sufficient to obtain the full 3D angular pose of the measurement device 100, when the measurement device 100 is not levelled, e.g., when the "up" direction of the measurement device 100 is not necessarily aligned with the z-axis direction (vertical direction).

In another example localization operation, the measurement device 100 is placed at an arbitrary measurement location with no known coordinates in the scene 310, and is controlled to shoot two control points. The measurement device 100 is controlled to shoot corners 316, 318 which correspond to corners 326, 328 with known coordinates in the design model 320. The measurement data, e.g., distances from the measurement device 100 to the corners 316, 318 along with information about (e.g., the sign of) the angle α between the two measurement directions 306, 308 are used with the known coordinates of corners 326, 328 to determine both the virtual device location 325 and the orientation of the measurement device 100 in the design model 320. In some embodiments, shooting two control points (e.g., two out of three corners 316, 317, 318 as described) is sufficient to obtain the full 3D angular pose of the measurement device 100, when the measurement device 100 is levelled. In at least one embodiment, shooting three control points (e.g., three corners 316, 317, 318) is sufficient to obtain the full 3D angular pose of the measurement device 100, when the measurement device 100 is not levelled.

In a further example localization operation, a measurement device comprising both a laser scanner and a total station on the same support is used. The laser scanner is used for localization in operation 206, whereas the total station is used for construction verification in other operations of the verification method 200. For example, the laser scanner is used to localize the measurement device by scanning the surrounding environment (e.g., scene 310) and registering the obtained scan data with other localized scans (cloud-to-cloud) or against the design model or parts thereof (cloud-to-model). Other localization arrangements are within the scopes of various embodiments.

When the localization has been completed, a view (or measurements or distances) of the object 312 from the measurement device 100 in the real world corresponds to a view (or measurements or distances) of the design element 322 from the virtual device location 325 in the design model 320.

Returning to FIG. 2, at operation 208, one or more design elements in the design model 320 are selected. Objects corresponding to the selected design elements will be subject to verification to check whether the objects are installed or built as designed. In specific examples described herein, the design element 322 in the design model 320 is selected, and the corresponding object 312 will be subject to verification.

In some embodiments, the design element selection at operation 208 comprises user input. For example, the design model 320 and the corresponding design elements is displayed on a display of the measurement device 100 and/or the external computer system 130, and a user selects one or more of the displayed design elements, e.g., by touching one or more design elements on a touch screen and then manipulating a button to confirm that a verification process is to be performed for objects corresponding to the selected design elements.

In some embodiments, one or more design elements are automatically selected at operation 208. For example, all design elements in the design model 320 are automatically selected to verify the entire physical structure built in accordance with the design model 320. For another example, the processor executes progress tracking software to maintain a "4D" (XYZ coordinates plus time evolution) model, and automatically chooses design elements of objects that were supposed to have been constructed in a time window (e.g., since the last verification) or objects that have been built but not yet verified. Alternatively or additionally, the processor executes a line of sight and/or range analysis to decide which of the design elements might be verified from a particular localized measurement location, and automatically selects the design elements verifiable from the particular localized measurement location.

In some embodiments, the selection of multiple design elements make it possible to perform a batch process to verify multiple objects at once. Each selected design element and the corresponding object are still verified, by performing at least operations 212, 216, 222, 224, independently of the other selected design elements and corresponding objects. For example, operation 212 for a selected design element A, operation 212 for another selected design element B, operation 216 for selected design element A, operation 216 for selected design element B, etc., may be performed in various orders. Batch processing of multiple design elements and corresponding objects saves time for the user, in at least one embodiment.

In some embodiments, multiple design elements are selected to be treated as a single, combined design element.

In such embodiments, the objects corresponding to the design elements are verified as a single, combined object, e.g., as a large object constituted by individual objects coupled together. The single, combined object is treated as a rigid body while ignoring mis-alignment or mis-installation errors of individual objects that constitute the single, combined object. This approach saves time by reducing the number of verifications to be performed for a physical structure. In some embodiments, this approaches further reduces complexity and/or increases accuracy. For example, in at least one embodiment, gusset plates and bolts are considered to be part of the associated beam, so that any measurements of the beam that happen to land on such gusset plates and bolts will better match the geometry.

In some embodiments, the design element selection at operation 208 is performed after the localization at operation 206. In at least one embodiment, the design element selection at operation 208 is performed before the localization at operation 206 or even before operation 202 of placing the measurement device at the scene.

At operation 210, an Augmented Reality (AR) image is generated and displayed to show one or more design elements overlayed on an image of one or more objects at the scene. An example of such an AR image is described with respect to FIG. 3B.

Figure 3B:
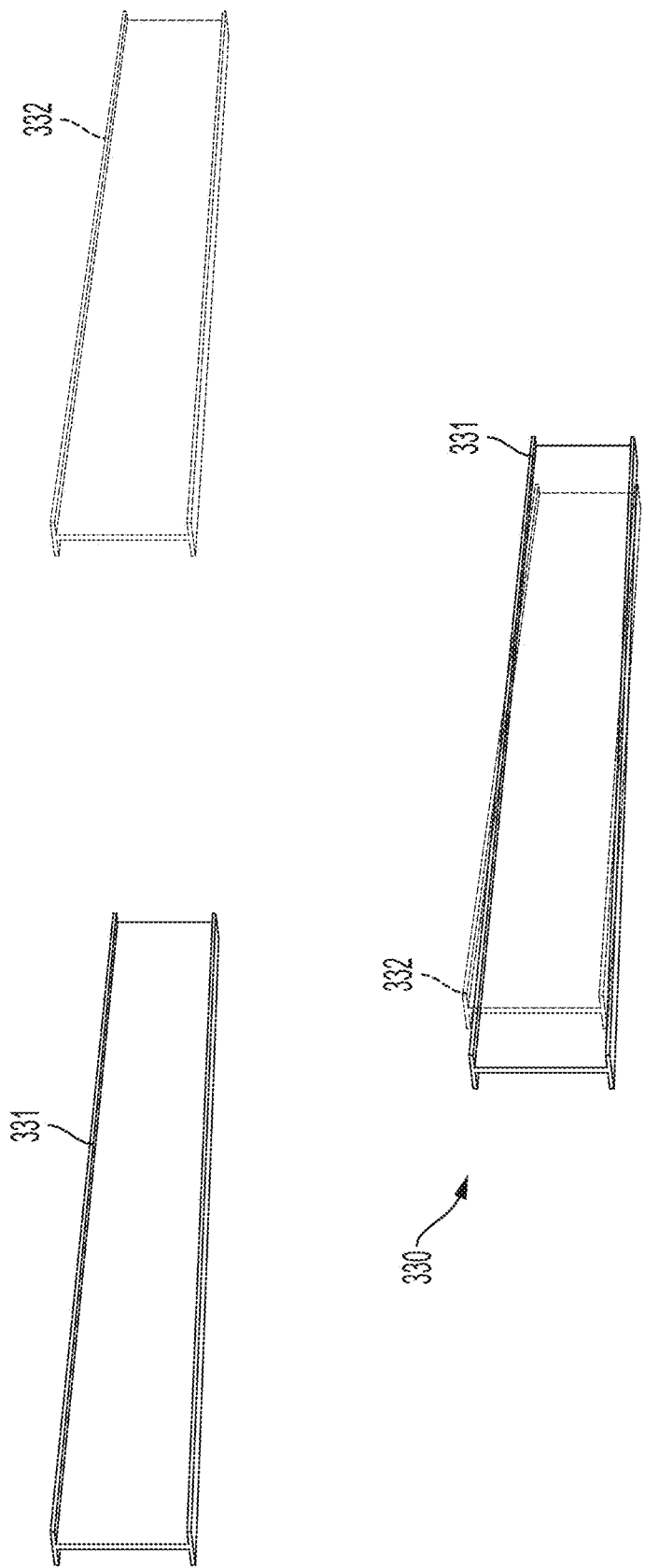
FIG. 3B is a diagram schematically showing an Augmented Reality (AR) image, in accordance with some embodiments.

FIG. 3B is a diagram schematically showing an AR image 330, in accordance with some embodiments. The AR image 330 comprises an image 331 of a physical object, e.g., an I-beam, at the scene, and a design element 332 which is a model of the I-beam in the corresponding design model. The physical object image 331 is captured by a camera, such as camera 119, of the measurement device. For example, the camera 119 is controlled to capture an image of a section of the scene 310 where an object to be verified is located. In some situations, at the beginning, the physical object image 331 and the design element 332 are displayed on a screen without being substantially aligned, or even do not overlap as illustrated at the top part in FIG. 3B. In at least one embodiment, the user is given the option or capability to move, e.g., by a drag on a touch screen, one of the image 331 and design element 332 over the other to roughly align the image 331 and design element 332. The resulting AR image 330, in which the design element 332 is overlayed on the image 331 of the physical object, is thus obtained. In some embodiments, information about the drag operation by the user, e.g., the drag distance and/or drag rotation angle, is used by the processor in determining sample directions as described with respect to operation 212. For example, when the user dragged the design element 5 degrees to the right, then all sample directions are also rotated 5 degrees to the right, so that the sample directions will be likely to hit the as-built object corresponding to the design element (and not miss the object completely) as described with respect to operation 216. In some embodiments, the AR image 330 is automatically generated with the design element 332 is overlayed on the image 331 of the physical object, and without user intervention. The AR image 330 gives the user feedback regarding whether the as-built object, i.e., the physical I-beam, matches the as-designed object, i.e., the design element 322.

In some embodiments, operation 210 of displaying an AR image is performed before the design element selection at operation 208. The AR image 330 gives the user additional information about which design element is to be selected, by presenting a visual indication of which objects might be significantly misplaced. In some embodiments, operation 210 of displaying an AR image is omitted. For example, operation 210 is omitted when the measurement device does not include a camera. In some embodiments, operation 210 is omitted even when the measurement device has a camera and capability to generate an AR image.

Returning to FIG. 2, at operation 212, a plurality of sample directions is automatically determined for the selected design element. The sample directions are generated in the design model and originate from the virtual device location of the measurement device in the design model. The sample directions in the design model 320 correspond to shooting directions in which the measurement device will perform measurements in the real world. Various examples of how sample directions are generated are described with respect to FIGS. 5-7E.

In some embodiments, a number of sample directions to be generated is determined based on various factors, including, but not limited to, the shape or geometry of the selected design element, the accuracy of the verification, the speed or processing time of the verification, the relative position of the virtual device location of the measurement device and the design element, or the like.

In principle, there are six degrees of freedom (three translations and three rotations) in a rigid body transform, and the location and orientation of an object can be determined by measurements of six distances from the measurement device to surfaces of the object. The required six distances correspond to six sample directions to be generated for a design element or corresponding object. In some situations, however, more than six distances, i.e., more than six sample directions, are required to account for factors like measurement noise and shape displacements or deviations between the design element (i.e., as-designed object) and the real world as-built shape of the object. In some embodiments, less than six distances are required. For example, if an identifiable point is measured, as described with respect to FIG. 3E, the measured identifiable point provides information about three degrees of freedom. As a result, only three degrees of freedom remain to be determined, e.g., by additional measurements of three distances, for a total of four measurements. If another identifiable point is measured, information about another two degrees of freedom is obtained (because the distance between the two identifiable points is already known from the geometry of the object), leaving only one degree of freedom to be determined, e.g., by an additional measurement of one distance, for a total of three measurements.

In at least one embodiment, twelve sample directions are generated for each design element. In at least one embodiment, those twelve sample directions are distributed at four sample directions per each of three principle planes/surfaces of the design element. If each of the twelve sample directions intersects the as-built object, then performing a distance measurement in each of the twelve sample directions will provide twelve pieces of information about the degrees of freedom (corresponding to twelve scalar equations constraining the degrees of freedom). More or fewer sample directions per design element and/or per plane/surface of a design element are within the scopes of various embodiments. For example, to obtain twelve pieces of information about the degrees of freedom—in one or more embodiments, nine sample directions and one identifiable point are measured. The identifiable point provides three pieces of information, as described herein. In another example, to obtain ten pieces of information about the degrees of freedom, in one or more embodiments, ten sample directions are measured. One ordinarily skilled in the art will understand that typically N independent equations are sufficient to fully constrain N degrees of freedom. For example, six independent equations are usually sufficient to fully constrain the six degrees of freedom of a general rigid body transform. Additional measurements are performed, in some embodiments, to account for the possibilities of misses, outliers, and/or mis-measurements and/or to determine statistical uncertainty in the calculated values of the transform parameters, as described herein. In any event, the handful of sample directions, i.e., the number of measurements, required in a verification process of one or more embodiments is much fewer than the number of measurements, e.g., thousands or more measurements, performed by a laser scanner for a similar task. The verification process in at least one embodiment is faster, and/or less complicated without significantly sacrificing accuracy, if at all, compared to other approach using laser scanners.

At operation 214, the generated sample directions are displayed together with at least the corresponding design element. In at least one embodiment, the user is given the option or capability to modify the sample directions, e.g., by adjusting, deleting or adding one or more sample directions. In some embodiments, the user is given the option or capability to adjust one or more of the generated and displayed sample directions, for example, as described with respect to FIG. 3C. Alternatively or additionally, in one or more embodiments, the user is given the option or capability to simply add a new sample direction, by identifying the new sample direction on the design element through a user interface, or by manually aiming the measurement device 100.

Figure 3C:
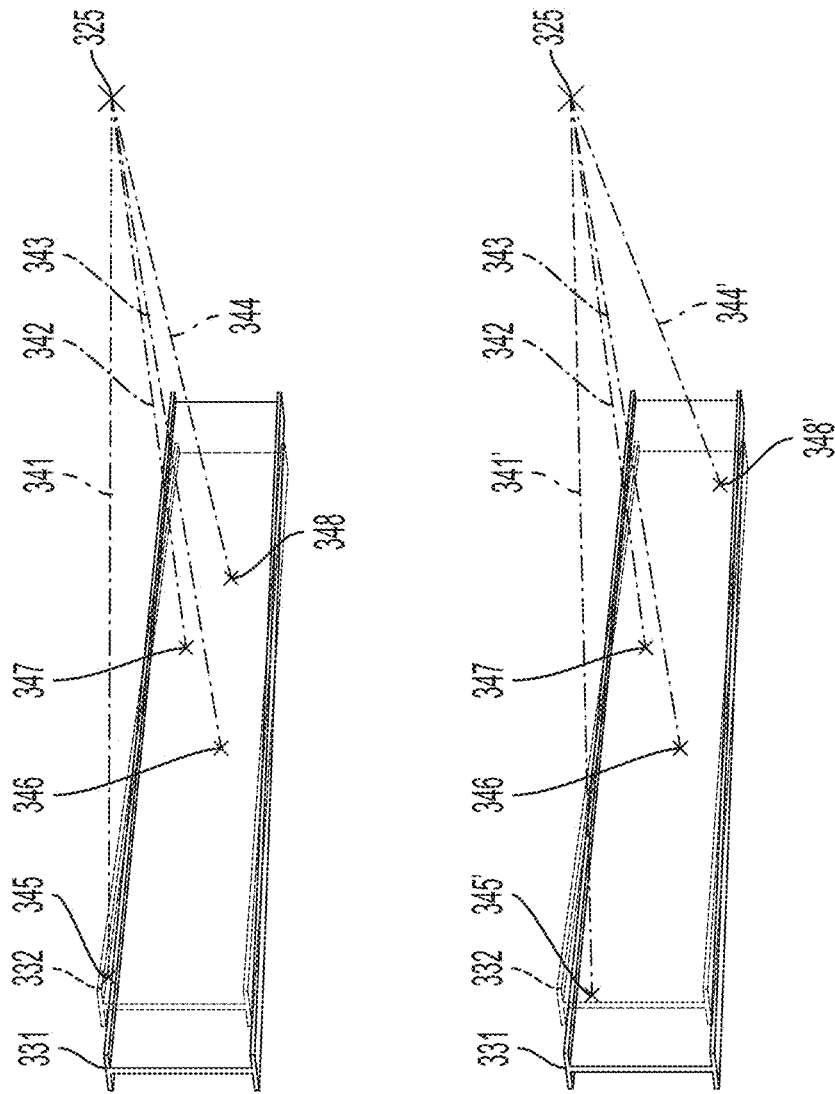
FIG. 3C is a diagram schematically showing modifications of one or more sample directions, in accordance with some embodiments.

FIG. 3C is a diagram schematically showing modifications of one or more sample directions, in accordance with some embodiments. The top part of FIG. 3C illustrates the sample directions 341-344 automatically generated for a side surface of the design element 332. Other sample directions automatically generated for other surfaces of the design element 332 are omitted for simplicity. The sample directions 341-344 extend from the virtual device location 325 of the measurement device towards the intended side surface of the design element 332. The sample directions 341-344 intersect, or hit, the side surface of the design element 322 at corresponding points 345-348. When the corresponding object is correctly built in accordance with the design element 322, the sample directions 341-344 should also hit a corresponding side face of the object. However, because the as-built object does not completely match the design element 332, one or more of the automatically generated sample directions may miss the as-built object. For example, the example display in FIG. 3C shows to a user that the automatically generated sample direction 341 is likely to miss the as-built object represented by image 331, or to hit a different surface of the as-built object. This prompts the user to modify at least the sample direction 341. In another example (not shown), the displayed image shows occlusion, i.e., a sample direction will hit another object in the foreground of the object to be verified. This situation also prompts the user to modify at least the sample direction in which occlusion may occur.

The bottom part of FIG. 3C illustrates a user-modified sample direction 341' which is modified from the automatically generated sample direction 341. The user-modified sample direction 341' is modified to increase the chance it will hit the intended side surface of the as-built object. In at least one embodiment, the user modifies an automatically generated sample direction by dragging the automatically generated sample direction to a different orientation. The bottom part of FIG. 3C further shows that another automatically generated sample direction 344 is modified to be user-modified sample direction 344' so that the corresponding sample points 345'-348' of the user-modified sample directions 341', 344' are further spaced apart from each other and/or are closer to the ends of the design element. This facilitates a rotation calculation in a transform described with respect to operation 222. In some embodiments, the user modifies fewer sample directions than in the example of FIG. 3C. Although FIG. 3C shows that the sample directions are displayed with an AR image comprising both the design element 332 and the image 331 of the as-built object, the image 331 is omitted in some embodiments.

As described herein, in some embodiments, the user is given the option or capability to add a new sample direction by identifying the new sample direction on the design element through a user interface, e.g., in a manner similar to the example for sample direction adjustment described with respect to FIG. 3C.

In one or more embodiments, the user is given the option or capability to add a new sample direction by manually aiming the measurement device 100, e.g., in a manner similar to that described with respect to operation 218. However, unlike operation 218 where the user both manually aims the measurement device 100 at an identifiable point and indicates the identifiable point on the design element, in operation 214 for adding a new sample direction, the user simply manually aims the measurement device 100 at a desired point on the as-built object. The manually aimed shooting direction of the measurement device 100 becomes a user-defined sample direction which is used for a subsequent automatic measurement as described with respect to operation 216.

In some embodiments, operation 214 is performed after one or more of operations 216, 218, 220, 222, 224, as described herein described with respect to operation 226 and corresponding options 236, 238, 240, 242. In at least one embodiment, operation 214 is omitted.

Returning to FIG. 2, at operation 216, the measurement device automatically performs measurements, each corresponding to one of the sample directions. In some embodiments, the sample directions used in the measurements include any user-modified sample direction(s) obtained at operation 214. In at least one embodiment, the sample directions used in the measurements are all automatically generated. An example for operation 216 is given in FIG. 3D.

FIG. 3D is a diagram schematically showing automatic measurements along sample directions, in accordance with some embodiments. For simplicity, not all sample directions are illustrated in FIG. 3D.

As shown on the right in FIG. 3D, in the design model 320, after the sample direction generation in operations 212 and any sample direction modification in operation 214, a set of sample directions 351-353 is obtained. The sample directions 351-353 intersect, or hit, the design element 322 at corresponding sample points 356-358. Distances d1, d2, d3 from the virtual device location 325 to the sample points 356-358 are determinable, e.g., by calculations, from model data included in the design model 320.

As shown on the left in FIG. 3D, in the scene 310, the measurement device 100 is automatically controlled to perform measurements in the same sample directions 351-353. For example, the processor automatically controls the robot and/or motor 120 to rotate the housing 104 and the EDM instrument 118 accommodated therein about the vertical and horizontal axes, to sequentially align the shooting direction 108 of the EDM instrument 118 along each of the sample directions. At each sample direction, the EDM instrument 118 emits a measurement signal, e.g., light, and detects the returned light to calculate a corresponding measured distance. The robot and/or motor 120 then automatically aligns the shooting direction 108 with a next sample direction and a measurement is made. This process is repeated until measurements in all sample directions have been made. The light emitted by the measurement device 100 in the sample directions 351, 352 is reflected off the object 312, resulting in corresponding measured points 356', 357' and corresponding measured distances d1', d2'. The light emitted by the measurement device 100 in the sample direction 353 misses the object 312, and does not return a measured distance. In some situations (not shown), the light emitted by the measurement device 100 in the sample direction 353 is reflected off another object or structure in the background of the object 312, and returns an outlier, i.e., a measured distance which is statistically inconsistent with the other measured distances d1', d2'. Another example of an outlier is when the light emitted by the measurement device 100 in a sample direction is reflected off another object or structure in the foreground of the object 312 and occluding the object 312. In some embodiments, outliers are filtered out from the measurement data collected by the measurement device 100, as described herein.

The differences (d1−d1') and (d2−d2') indicate a displacement or deviation between the as-built object 312 and the as-designed object 322. In some embodiments, when the absolute values of the differences (d1−d1') and (d2−d2') are less than an acceptable installation error or tolerance (e.g., a few mm), the as-built object 312 is accepted and no re-work is required. However, when one or more of the absolute values of the differences (d1−d1') and (d2−d2') is higher than the acceptable installation error, the processor generates a warning or indication that the as-built object 312 is to be re-worked.

In at least one embodiment, a miss or outlier in the automatic measurements at operation 216 prompts the processor to return to operation 214 to permit the user to adjust the sample direction(s) corresponding to the miss and/or to add one or more new sample direction(s). Thereafter, automatic measurements at operation 216 are again performed. As a result, a sufficient number of data points (or measured distances) is obtained for a subsequent calculation of a verification result as described herein.

Returning to FIG. 2, at operation 218, the user is given the option or capability to perform one or more manual point-to-point measurements (also referred to herein as "manual measurements" or "user-controlled measurements"). In some embodiments, the processor requests, e.g., by a prompt on the display, the user to perform manual measurements. In a manual measurement, the measurement device 100 is manually controlled by a user, either by the user's direct manipulation of one or more controls on the measurement device 100 or via user input to a program that controls how the measurement device 100 makes measurements. For example, the processor gives the user the option to perform a manual measurement when an automatic measurement attempt in a sample direction represents a miss, as described with respect to FIG. 3D. For another example, the processor gives the user the option to perform a manual measurement of an identifiable point to constrain a transform to be calculated, as described herein. An example for operation 218 is given in FIG. 3E.

Figure 3E:
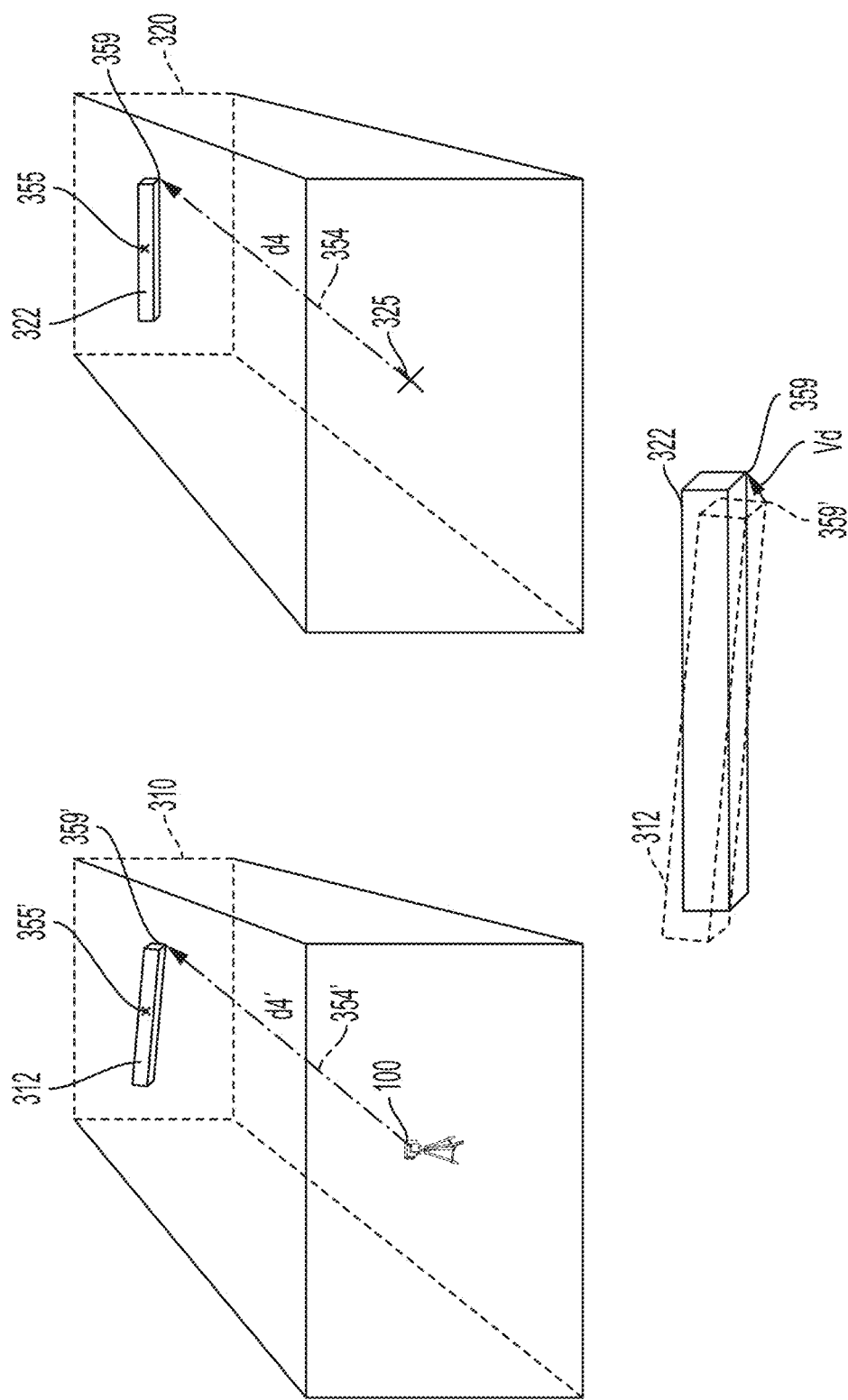
FIG. 3E is a diagram schematically showing a manual measurement of an identifiable point, in accordance with some embodiments.

FIG. 3E is a diagram schematically showing a manual measurement of an identifiable point, in accordance with some embodiments.

As shown on the right in FIG. 3E, the user identifies, on the design model 320, an identifiable point the user is going to manually shoot with the measurement device 100 at the scene 310. For example, the user identifies the identifiable point by a touch on a touch screen that shows the design element 322. An identifiable point is one that is visually recognizable and identifiable on both the object 312 and the design element 322. In some embodiments, an identifiable point is a visually recognizable feature on the geometry of the design element 322 and object 312. For example, in FIG. 3E, an identifiable point 359 is a corner on the design element 322 and the corresponding identifiable point 359' is a corresponding corner on the object 312. Additionally or alternatively, an identifiable point is a visible marker or a specific feature on the object 312 and design element 322. For example, in FIG. 3E, an identifiable point 355' is a visible marker on the object 312 and has a corresponding identifiable marker 355 on the design element 322. For a manual measurement, the user selects an identifiable point that is visible from the measurement device 100. In some situation, the identifiable point 355' in a middle section of the object 312 is advantageously usable in a manual measurement when the ends of the object 312 are occluded by other objects at the scene 310.

As shown on the left in FIG. 3E, in the scene 310, to perform a manual measurement in the scene 310, the user manually controls the measurement device 100 to aim the measurement device 100, i.e., to aim the EDM instrument 118, at the identifiable point that was identified on the design element 322. In some embodiments, the described order is reversed, i.e., the user shoots the identifiable point on the object 312 first, then identifies the corresponding identifiable point on the design element 322. In FIG. 3E, the user identifies the identifiable point 359 on the design element 322 and shoots the corresponding identifiable point 359' on the object 312. In an example, the measurement device 100 or EDM instrument 118 has a visible laser pointer coinciding with the shooting direction 108. The user controls the measurement device 100 or EDM instrument 118, by manual control and/or through a user interface, to aim the visible laser pointer at the identifiable point 359', then instructs the measurement device 100 or EDM instrument 118 to shoot, i.e., take measurement of, the identifiable point 359'. In some embodiments, the measurement device 100 has a telescopic lens with a targeting reticle that indicates the point that will be measured and that can be used for manual aiming, in place of or in addition to the laser pointer. A measurement is made by the measurement device 100 along the shooting direction 354' from the measurement device 100 to the identifiable point 359', resulting in a measured distance d4'. The orientation of the shooting direction 354' is also included in the measurement result.

As shown on the right in FIG. 3E, a corresponding distance d4 from the virtual device location 325 to the corresponding identifiable point 359 is determinable, e.g., by calculations, from model data included in the design model 320. The direction 354 from the virtual device location 325 to the identifiable point 359 is different from the shooting direction 354'.

At the bottom view in FIG. 3E, the object 312 and design element 322 are schematically illustrated in an enlarged scale to show a displacement vector Vd. This displacement vector Vd is determined from a first vector corresponding to the measured distance d4' and the orientation of the shooting direction 354', and a second vector corresponding to the distance d4 and the orientation of the direction 354. The displacement vector Vd indicates a displacement or deviation between the as-built object 312 and the as-designed object 322.

As discussed herein, a manual measurement of an identifiable point provides information about three degrees of freedom as opposed to one degree of freedom given by an automatic measurement as described with respect to operation 216. However, a manual measurement, with the user's manual aiming of the measurement device 100, is time consuming and requires additional skill and/or labor. In at least one embodiment, to take advantage of both automatic and manual measurements, automatic measurements are performed first, and if additional measurement data are still required, a manual measurement is performed. An example situation where a manual measurement is performed is when neither ends of the object 312 were visible from the measurement device 100, so that measurement data collected from automatic measurements are potentially not sufficient to determine a specific location of the object 312 along a lengthwise direction (sliding direction) thereof. This situation is referred to as a "sliding" result and is described with respect to FIG. 3G. In such a sliding result, a manual measurement shooting the identifiable point 355', which is in the middle of the object 312 and is visible to the measurement device 100, gives additional and sufficient information to constrain the object 312 along the sliding direction, because the manual measurement measures how far the identifiable point 355' slid.

In some embodiments, operation 218 is omitted. In at least one embodiment, operation 218 is performed after one or more of operations 220, 222, 224, as described herein described with respect to operation 226 and corresponding options 236, 238, 240, 242.

Returning to FIG. 2, at operation 220, measurement results are output. For example, measurement results from the automatic measurements at operation 216 and any manual measurement at operation 218 are displayed on a display of the measurement device 100 and/or the external computer system 130. In some embodiments, the user is given at this stage the option to control the verification system 110 to re-execute one or more earlier described operations, such as one or more of operations 214-218. An example of a display of measurement results is described with respect to FIG. 3F.

FIG. 3F is a diagram schematically showing a display of measurement data associated with a design element being verified, in accordance with some embodiments.

As shown on the left in FIG. 3F, a design model 360 describes a physical structure comprising a plurality of I-beams connected with each other. Each I-beam in the design model 360 is a design element and corresponds to an actual I-beam being constructed or installed at a real world scene. A selected design element, i.e., I-beam 361, is illustrated in an enlarged view 368 to show various sample points 362-366 where a plurality of corresponding sample directions (not shown) intersect a surface of the design element 361. In some embodiments, at least one of the sample directions and the corresponding at least one sample point are automatically generated, e.g., as described with respect to operation 212. In at least one embodiment, all sample directions and all corresponding sample points are automatically generated. The view 368 is another example of a view displayed to the user at operation 214.

As shown on the right in FIG. 3F, a view 369 is generated by the processor to show measurement data associated with the selected design element 361, in accordance with operation 220. The view 369 displays, over the surface of selected design element 361, measured points 362'-366' corresponding to the sample points 362-366 in the view 368. The measured points 362'-366' are obtained from measurements by the measurement device 100 along the same sample directions that correspond to the sample points 362-366 in the view 368. The measured points 362'-366' are displayed with corresponding labels (not numbered) that show displacements between the corresponding pair of measured points and sample points. For example, the label "1 mm" next to the measured point 362' indicates that the measured points 362' is off the corresponding sample point 362 by 1 mm which is similar to the distance difference (d1–d1') or (d2–d2') described with respect to FIG. 3D. In some embodiments, a label is accompanied with a sign "+" or "−" (not shown). For example, a label "−3 mm" indicates that the measured point is 3 mm too close, i.e., the measured point is between the measurement device and the corresponding sample point. A label "+3 mm" indicates that the measured point is 3 mm too far, i.e., the sample point is between the measurement device and the measured point.

In some embodiments, the measured points 362'-366' and/or the corresponding labels are displayed with different formats, e.g., colors, to indicate which measured points are acceptable and which measured points are beyond an acceptable installation error limit (or tolerance). For example, the measured points 362', 363' are illustrated with the green color indicating that the corresponding displacements of 1 mm are acceptable. The measured point 364' is illustrated with the yellow color indicating that the corresponding displacement of 4 mm is at the installation error limit, but may be acceptable if other measured points are not worse. The measured point 365' is illustrated with the purple color indicating that the corresponding displacement of 7 mm is beyond the installation error limit, and the measured point 366' is illustrated with the red color indicating that the corresponding displacement of 13 mm is seriously beyond the installation error limit and requires rebuilding, reworking or reinstallation of the corresponding as-built I-beam. The view 369 as shown and/or described is an example. Other manners for outputting the measurement data are within the scopes of various embodiments. For example, in lieu of or in addition to displaying the measurement data, the measurement data are output and stored in a storage device for later processing. In some embodiments, operation 220 is omitted.

Returning to FIG. 2, at operation 222, a verification result (also referred to herein as "Result") is calculated based on the shape or geometry of the design element and the measurement data, to indicate a relation between the design element and the corresponding as-built object. At operation 224, information about the calculated verification result is output, e.g., displayed and/or stored in a storage device. In some embodiments, the output information about the calculated verification result includes a transform as described herein. Examples of transforms include linear transforms and non-linear transforms. Examples of linear transforms include, but are not limited to, rotation, translation, shearing, scaling, or the like. A linear transform that includes only rotation and/or translation is referred to as a rigid body transform. In an example, a non-linear transform is applied when there is a deviation between a shape of the as-built object and a shape of the as-designed object. For example, when the design element is a straight long beam, the as-built object may be sagging in the middle and may not be entirely straight as designed. In this situation, a non-linear transform may be applied by the processor to distort the straight shape of the as-designed object to match the shape of the as-built object. Other linear and non-linear transforms are within the scopes of various embodiments. In some embodiments, the output information about the calculated verification result includes parameters of the rotation and/or translation portions of the transform. In some embodiments, the output information about the calculated verification result includes information about deviations between the design element and the as-built object. Other output arrangements are within the scopes of various embodiments.

In one or more embodiments specifically described herein below, a rigid body transform is used as an example of a transform. However, transforms other than rigid body transforms are encompassed within the scope of the described embodiment.

In some embodiments, the calculated Result includes a rigid body transform (also referred to herein as "Result transform" or "transform") which describes the location and orientation of the as-built Object in the real world relative to its intended location as indicated by the location and orientation of the corresponding Design Element in the Design Model. In some embodiments, this rigid body transform is a pure translation in one or more directions. In some embodiments, this rigid body transform is a general transform, i.e., it is a combination of a translation and a rotation about one or more axes. For example, in operation 222, the processor maps the measured points 356', 357', 359', described with respect to FIGS. 3D-3E, from the space of the scene 310 and/or object 312 onto the space of the design model 320 and/or design element 322, and solves one or more problem to find a rigid body transform that translates and/or rotates the design element 322 to match with the mapped measured points. In some embodiments, the design element 322 is considered matched to the mapped measured points when the rigid body transform places the design element 322 as close as possible to the mapped measured points, in accordance with a predetermined algorithm, e.g., the least-squares algorithm. Other algorithms are within the scopes of various embodiments.

In some embodiments, the Result includes information about the statistical uncertainty in values of parameters of the rigid body transform (also referred to herein as "transform parameters"). In some embodiments, this information about the statistical uncertainty in the values of the transform parameters is expressed as a covariance matrix.

In some embodiment, the Result includes information about which, if any, of the measurements are statistical outliers and should be discarded, for example, as described with respect to FIG. 3D. Such outliers can be caused when the line of sight between the measurement device, e.g., the EDM instrument 118, and the as-built Object is occluded by another object. Outliers can also be caused when the line of sight from the measurement device in a sample direction does not strike the as-built Object and instead strikes a background object or does not strike anything (resulting in a null measurement). Outliers can also be caused by a failure of the measurement device. Outliers can also be caused by differences between the shape of the physical as-built Object and the shape of the corresponding Design Element. In an example, a shape difference occurs when the measurement signal hits the head of a bolt used to connect an I-beam (i.e., the as-built Object) instead of a surface of the I-beam. In another example, a shape difference occurs when the shape of the as-built Object (e.g., an I-beam) is severely distorted, for example, due to sagging in the I-beam. In some embodiments, the Result includes an estimate of the as-built Object's shape distortion, if any.

In some embodiments, the Result includes information about which, if any, parameters of the transform were unconstrained by the measurement data (or measured points). An example of transform parameters being unconstrained by the measurement data is described with respect to FIG. 3G. In some embodiments, the Design Element is transformed by the Result transform to create a virtual As-Built Design Element and the distance from each measured point in the measurement data to the surface of the As-Built Design Element is included in the Result. The As-Built Design Element is a model or virtual representation of the as-built Object in the space of the Design Model. As described with respect to FIGS. 3D-3E, when a measurement of a point on the physical as-built Object corresponding to a particular point on the Design Element was performed, the displacement between the point on the physical as-built Object and the corresponding point on the As-Built Design Element is included in the Result.

In some embodiments, the Result for an as-built Object is first calculated, at operation 222, by the processor for a transform that is a pure translation, and information about the distance and/or displacement between measured points and the As-Built Design Element is presented, e.g., on the display in operation 224, to the user with, in some embodiments, color coding to indicate which points are close to the As-Built Design Element and which are far. An example color coding scheme is described with respect to FIG. 3F. In some embodiments, the user is presented by the processor and via a display with a choice to include rotations in the transform and, in response to user input indicating that the user chooses to do so, a new Result with a general transform is calculated and presented to the user, e.g., by re-executing operations 222, 224. In some embodiments, when the user chooses to include rotations, further measurements are performed for use in the calculation of the new Result, e.g., by re-executing one or more of operations 212-220 in whole or in part, as described with respect to operation 226 and corresponding options 236, 238, 240, 242. In some embodiments, the processor applies an algorithm (for example, performing chi-squared tests) and automatically decides how general the transform in the Result should be, i.e., whether a rotation is to be included in the transform. In some embodiments, when both pure translation and general transforms are calculated, the Result includes information for both pure translation and general transforms.

In some embodiments, the Result transform is calculated using a least-squares optimization technique such as "point-to-point" or "point-to-plane" registration. In at least one embodiment, these techniques correspond to solving an optimization problem by, e.g., maximizing a corresponding objective function of the optimization problem. In some embodiments, such techniques correspond to finding the minimum energy configuration of an energy function of a set of springs if the set of springs were used to connect the measured points (mapped into the space of the Design Model) with corresponding points on the surface of the As-Built Design Element and the parameters of the transform mapping the Design Element into the As-Built Design Element were allowed to vary. In some embodiments, the vector between a particular measured point (mapped into the space of the Design Model) with a corresponding point on the surface of the As-Built Design Element is called the "Displacement Vector" for that measured point. A person ordinarily skilled in the art will understand that as the transform parameters are changed, the location of the surface of the As-Built Design Element will change accordingly, and that the Displacement Vector for a measured point is therefore a function of the transform parameters. In some embodiments, the energy function associated with each measured point's spring is a quadratic function of that point's Displacement Vector. In some embodiments, the energy function associated with each measured point's spring is a non-quadratic function of that point's Displacement Vector, such as an exponential function. In some embodiments, such as "point-to-plane" algorithms, the energy function associated with each measured point's spring depends on the geometric properties such as normal vector or curvature at the corresponding point of the As-Built Design Element's surface. In some embodiments, the corresponding point is found by finding the closest point on the current As-Built Design Element candidate's surface, and a minimum energy transform is found by iteratively repeating the process of finding closest corresponding points on the current As-Built Design Element candidate then solving for the minimum energy transform with that set of correspondences to obtain a new As-Built Design Element candidate upon which the process can be repeated until it converges. A person ordinarily skilled in the art will understand that the general class of such techniques for finding a transform that defines an As-Built Design Element that is a good fit to the measured points is referred to as "Iterative Closest Point Algorithms."

A person ordinarily skilled in the art will understand that in energy minimization problems such as those described above, "flat directions" of the energy function exist; these are configurations for which the transformation parameters can be changed without changing the energy associated with the new displacement vectors. For example, in point-to-plane algorithms, the energy function depends on the surface normal of the As-Built Design Element in such a way that the correspondence point can be thought of as being allowed to "slide" along the plane perpendicular to the surface normal. For example, if the design element were a cube and the only points that had been measured for such a cube were on the bottom of the cube, then the cube would be free to slide along the plane of the bottom of the cube and to rotate around an axis parallel to the bottom's normal vector. Such a person ordinarily skilled in the art will further understand that such flat directions can be identified and characterized by such linear algebra techniques as Singular Value Decomposition (SVD) and/or eigen-value and eigen-vector analysis, and that these flat directions correspond to transform parameters that are unconstrained by the measured points. In some embodiments, transform parameters that are unconstrained by the measured points are identified and reported in the Result to the user. In some embodiments, suggestions are made by the processor to the user as to which identifiable point(s) on the as-built Object might be measured to constrain these unconstrained transform parameters. In at least one embodiment, the user is given the option to perform a manual measurement with the measurement device 100, as described with respect to operation 218 and FIG. 3E, to obtain additional measurement data to constrain the unconstrained transform parameters.

Figure 3G:
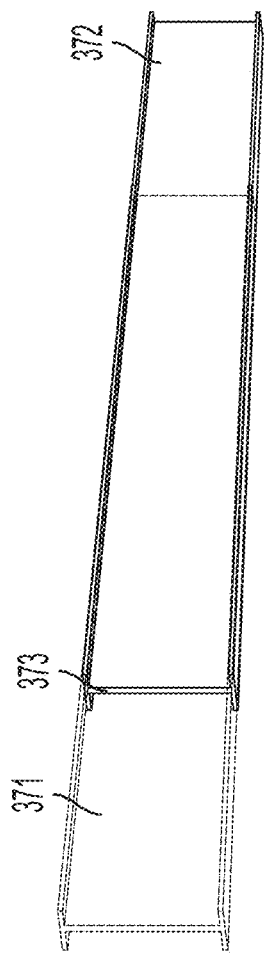
FIG. 3G is a diagram schematically showing an example verification result, in accordance with some embodiments.

FIG. 3G is a diagram schematically showing an example verification result, in accordance with some embodiments. In FIG. 3G, an As-Built Design Element 371 is shown as being matched to an image of an as-built Object 372. The As-Built Design Element 371 is a result of a rigid body transform of a Design Element (not shown). The rigid body transform is determined such that the As-Built Design Element 371 matches best with measured points which were obtained in measurements of the as-built Object 372 by the measurement device 100 and then mapped onto the space of the design model. The rigid body transform has unconstrained transform parameters. As a result, the As-Built Design Element 371 does not have a specific location, and can slide along a length of the as-built Object 372. A reason may be that, due to the narrow width of the as-built Object 372, which is an I-beam, none of the sample directions resulted in a measured point on an end face 373 of the as-built Object 372. Without a measured point on the end face 373 of the as-built Object 372, or on the opposite end face (not visible in FIG. 3G) of the as-built Object 372, the As-Built Design Element 371 is unconstrained with respect to translations along the length of the as-built Object 372. In some embodiments, the processor prompts, e.g., via the display, the user to obtain, e.g., by one or more manual measurements, additional measurement data on the end face 373 or on the opposite end face of the as-built Object 372, to constrain the unconstrained transform parameters. When the transform parameters are constrained, the As-Built Design Element 371 should closely match the as-built Object 372.

A person ordinarily skilled in the art will understand that if all measurements of the as-built Object were perfect and if the shape of the as-built Object perfectly matched the shape of the corresponding Design Element, then a transform could be found which would make the As-Built Design Element perfectly coincident with the as-built Object (mapped into the Design Model) and for this transform all of the Displacement Vectors would be zero. Such a person ordinarily skilled in the art would also understand that real-world measurements are not perfect, and that the shape of a real-world as-built Object will not perfectly match the shape of the corresponding Design Element, and that these imperfections will result in uncertainties in values of the transform parameters. Such uncertainties in a multi-parameter fit are typically characterized by a Covariance Matrix that, in the case of Gaussian statistics, describes the distribution function of the correlated fluctuations of the parameters. In at least one embodiment, the processor requests measurements in more sample directions than the minimal number needed to constrain the parameters of the Result transform, and uses these extra measurements to estimate the statistical uncertainties in the parameters of the Result transform. In some embodiments, this is performed by calculating the second derivative of the energy function with respect to the transform parameters and using the second derivative of the energy function to infer a Covariance Matrix. In some embodiments, this is performed by using Jackknife or Bootstrap techniques to generate a synthetic statistical ensemble of transform parameters. In some embodiments, the statistical characteristics of the Displacement Vectors are used to detect points that are likely to be outliers and suppress their effect on the Result transform. In some embodiments, this is performed by calculating the standard deviation of the magnitude of the Displacement Vectors across the set of measured points and identifying any measured point whose Displacement Vector magnitude is more than, for example four standard deviations away from the median value. In some embodiments, outliers are identified by performing a chi-squared goodness-of-fit analysis including and omitting an outlier candidate.

In some embodiments, the Result transform is calculated using RANSAC techniques, where the processor requests measurements in more sample directions than the minimal number needed to constrain the parameters of the Result transform, and then repeatedly randomly selects a minimal subset of the sample directions sufficient to fully constrain the Result transform. Each of these subsets determines a candidate Result transform which is scored according to the number of Displacement Vectors which are smaller than some threshold, and the candidate Result transform with the highest score is reported, at operation 224, as the Result transform to the user. In some embodiments, the process returns to operation 208 to permit the user to select one or more further design elements for verification from the current measurement location, or the user moves the measurement device to another measurement location to continue to verify other objects and/or physical structures at the scene.

In some embodiments, after any of operations 216-224, the process proceeds to operation 226 where it is determined whether the measurement data collected and/or the verification result calculated so far are sufficient for verification of the current design element(s). If the determination is positive (Yes from operation 226), the process proceeds to operation 234 to finish with the current design element(s). If the determination is negative (No from operation 226), the process proceeds to operation 212, 214, 218, or 222 in response to user input and/or a determination by the processor.

In at least one embodiment, the determination at operation 226 is made by the user. In an example, the sample direction determination at operation 212 and/or the verification result calculation at operation 222 were, in a first pass, executed to collect measurement data for and/or calculate a rigid body transform that includes translations only and without rotations. The verification result including translations only was output at operation 224. At operation 226, the processor prompts, e.g., via the display, the user to evaluate whether the measurement data collected and/or the verification result including translations only for the current design element(s) are sufficient. The processor further provides, e.g., via the display, the user with one or more of options 236, 238, 240, 242. In option 236, the process returns to operation 212 to automatically determine further sample directions for collecting additional measurement data by automatic measurements. In option 238, the process returns to operation 214, e.g., in case of a miss or an outlier, to permit the user to manually modify sample directions, e.g., by adjusting or adding one or more sample directions. In option 240, the process returns to operation 218 to collect additional measurement data by manual measurement. In option 242, the process returns to operation 222 to recalculate the verification result based on a different set of constraints (e.g., with rotations allowed) without collecting additional measurement data. The user, upon being prompted at operation 226, might realize that the verification result including translations only did not fit well to the measurement data (i.e., No at operation 226). The user might select option 236 or 238 to return to operation 212 or 214 to determine, automatically or manually, further sample directions for collecting additional measurement data. The additional measurement data are combined with the measurement data already obtained at the first pass to calculate, at operation 222, a rigid body transform that includes both translations and rotations. Alternatively, the user might select option 242 to return to operation 222 to recalculate, without additional measurements, a rigid body transform that includes both translations and rotations.

In another example, the verification result output at operation 224 includes a "sliding" result, as described with respect to FIG. 3G. The user, upon being prompted at operation 226, might realize that the "sliding" result is not satisfactory (i.e., No at operation 226). The user might select option 240 to return to operation 218 to perform a manual measurement to collect additional measurement data to constrain the object being verified along the sliding direction, as described herein.

In some embodiments, a determination at operation 226 and/or a determination to proceed with which of options 236, 238, 240, 242 is/are made automatically by the processor, without user input or intervention. In an example, operation 212 only determines one sample direction when it is first performed, after which the process proceeds to operations 216 through 222. The process then proceeds to operation 226, where the processor determines whether sufficient measurements have been made. If the measurements are not sufficient, the process returns to operation 212 where a next sample direction is determined based on information about the current measurements and the current solution (and/or verification result and/or transform) found in operation 222, and this loop repeats until the processor determines at operation 226 that sufficient measurements have been made. For example, if a particular measurement is a miss and the current solution indicates that the object has been mis-installed to the left, the processor might choose a new sample direction to the left of the sample direction that missed, in an attempt to get a valid measurement of the object. In another example, if the device was unable to obtain a measurement in a particular direction, e.g., due to high reflectivity or low albedo of the surface of the object at the point being measured, the processor might choose a new sample direction to replace the failed direction. In some embodiments, a situation where the measurement device was unable to perform a measurement due to high reflectivity or low albedo of the surface of the object at the point being measured is considered as a "miss." In some embodiments different repetitions of the loop through operation 226 will result in different options 236, 238, 240 or 242 being chosen and/or a different determination at operation 226. In example, the first twelve sample directions might be automatically measured with the processor making the determination at operation 226, at which point the process switches over to presenting the results to the user as described herein.

In at least one embodiment, operations 212 and 214 are performed to obtain an initial set of sample directions and allow the user to adjust them, but the sample directions are used one at a time for automatic measurement. After each measurement (i.e., each sample direction used for automatic measurement) at operation 216, the processor performs operation 226 to determine if more measurements are required. If more measurements are indeed required, the processor performs operation 212 to choose the next measurement (i.e., the next sample direction) to be performed from the initial set of sample directions. In some embodiments, operations 226, 234 and options 236, 238, 240, 242 are omitted.

Figure 4:
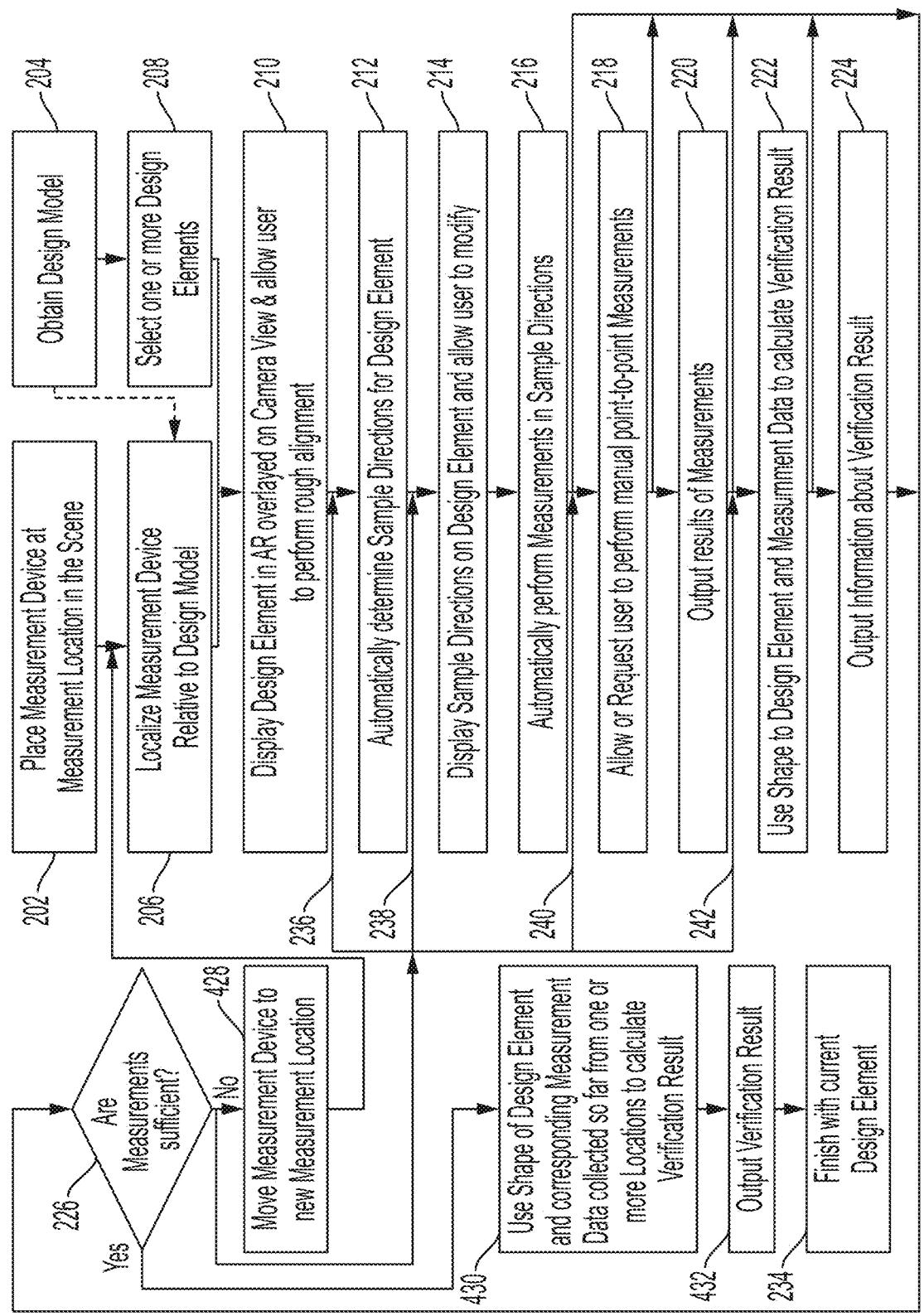
FIG. 4 is a flowchart of a verification method using a measurement device, in accordance with some embodiments.

FIG. 4 is a flowchart of a verification method 400 using a measurement device, in accordance with some embodiments. In some embodiments, the measurement device 100 is used in the verification method 400, alone or in cooperation with the external computer system 130. In the verification method 400, operations corresponding to those of the verification method 200 are designated by the same reference numerals. Compared to the verification method 200, the verification method 400 additionally comprises operations 428, 430, 432 directed to performing additional measurements for the same design element(s) but from one or more further measurement locations, and calculating the verification result based on combined measurement data collected from multiple measurement locations.

In some embodiments, a verification process performed from a single measurement location, for example, as described with respect to FIG. 2 is sufficient to confirm whether or not an as-built object is correctly built or installed in accordance with the corresponding design element. In one or more embodiments, measurement data from a single measurement location may not be sufficient for verification of a design element and the corresponding as-built object, and additional measurement data for the same as-built object/design element from a different measurement location are needed or desirable. For example, when the measurement device, at a current measurement location, is directly in front of a rectangular column in such a way that only a single face of the column is visible by the measurement device, it is not possible to verify other faces of the column from the current measurement location. In this situation, the user might want to move, or the processor requests the user to move, the measurement device to a different measurement location to obtain a second set of measurements for one or more faces whose surface normal points in a different direction so that the placement of the as-built object in that direction can be determined. An example of this process is described with respect to FIG. 4.

In the verification method 400 in FIG. 4, operations 202-224 are performed from a first measurement location as described with respect to FIG. 2. In some embodiments, after any of operations 216-224, the process proceeds to operation 226 where it is determined whether the measurement data collected and/or the verification result calculated so far for the current design element(s) are sufficient for verification of the current design element(s). If the determination is negative (No from operation 226), the process proceeds to operation 428, 212, 218 or 222 in response to user input and/or a determination by the processor. If the determination is positive (Yes from operation 226), the process proceeds to operation 430.

In at least one embodiment, the determination at operation 226 is made by the user. For example, the processor prompts, e.g., via the display, the user to evaluate whether the measurement data collected and/or the verification result calculated so far for the current design element(s) are sufficient. In an example as discussed above, the user may realize that additional measurements from a different measurement location are needed to obtain measurement data for other faces of the as-built object which are not visible to the measurement device from the current measurement location. In a further example, the user may realize that the transform output at operation 224 includes unconstrained transform parameters, and that additional measurements from a different measurement location are needed to constrain the unconstrained transform parameters. In another example, multiple design elements are selected for batch processing at operation 208, and it is determined that measurements from the current measurement location do not cover all selected design elements, e.g., when one or more of the selected design elements, or parts thereof, are not visible to the measurement device at the current measurement location. In some embodiments, the user is presented, by the processor and via a display, with an option to proceed to operation 428 to change the measurement location, in addition to options 236, 238, 240, 242 described with respect to FIG. 2. In some embodiments, one or more or all of options 236, 238, 240, 242 are omitted, and the process proceeds to operation 428 in response to a negative determination at operation 226. In some embodiments, the determination at operation 226 is made automatically by the processor, without user input or intervention. In the following description, a situation where operation 428 follows a negative determination at operation 226 is described.

At operation 428, when the determination at operation 226 is that additional measurements from a different measurement location are needed, the measurement device is moved to a new, e.g., second, measurement location. In some embodiments, the user decides where the new measurement location is going to be. In at least one embodiment, the processor provides a prompt, e.g., via the display, about a direction or location for moving the measurement device. For example, the processor provides such a prompt about the moving direction of the measurement device, based on the measurement data collected so far. In another example, the display displays, under control by the processor, a plan view of the design model and highlights a new measurement location in the plan view.

When the user confirms, e.g., by user input provided through the I/O device to the processor, that the measurement device is now placed at a new measurement location, the process returns to operation 206 to localize the measurement device at the new measurement location relative to the same design model. One or more of operations 210-224 are executed again for the same current design element(s), but from/for the new measurement location. For example, at operation 212, a new set of sample directions is automatically generated for the current design element(s) but from a new virtual device location corresponding to the new measurement location. In some embodiments, for the new measurement location, operations 206, 212 and 216 are performed, whereas one or more of operations 210, 214, 218, 220, 222, 224 are optional or omitted.

The process then returns to operation 226 to again determine whether the measurement data collected and/or the verification result calculated so far for the current design element(s) from multiple measurement locations, e.g., the first and second measurement locations, are sufficient. When the determination is negative (No from operation 226), the process proceeds to operation 428 to move the measurement device to a further new, e.g., third, measurement location. The process is then repeated as described herein with respect to the second measurement location. When the determination at operation 226 is positive, the process proceeds to operation 430 where a verification result is calculated based on the shape or geometry of the current design element(s) and the measurement data collected so far from one or more measurement locations.

When operation 430 is reached after measurements from one measurement location, e.g., the first measurement location, the verification result calculation at operation 430 and the verification result output at subsequent operation 432 are the same as the corresponding operations 222, 224. When both operations 222 and 224 have not been performed before the process reaching operation 430, both operations 430 and 432 are performed as described with respect to the corresponding operations 222 and 224, and the verification process is finished for the current design element(s) at operation 234. When operation 222 has been performed and operation 224 has not been performed before the process reaching operation 430, operation 430 is omitted, operation 432 being the same as operation 224 is performed, and the verification process is finished for the current design element(s) at operation 234. When both operations 222 and 224 have been performed before the process reaching operation 430, both operations 430 and 432 are omitted, and the verification process is finished for the current design element(s) at operation 234.

When operation 430 is reached after measurements from multiple measurement locations, the verification result calculation at operation 430 is similar to the corresponding operation 222, with a difference that the measurement data collected so far from multiple measurement locations for the current design element(s) are used for calculating a rigid body transform. In some embodiments, the verification result further comprises additional information as described with respect to operation 222. At operation 432, the verification result is output, as described with respect to operation 224. The verification process is then finished for the current design element(s) at operation 234.

In some embodiments, the described operations and measurement locations in the verification method 400 are interspersed between multiple current design elements (which were, e.g., selected for batch processing at operation 208). For example, first, measurements are performed for Design Elements 1, 2, and 3 from measurement location A. The measurement device is then moved to measurement location B where measurements are performed for Design Elements 4 and 5. The measurement device is then moved to measurement location C where measurements are performed for Design Elements 3 and 4. The measurement device is then moved to measurement location D where measurements are performed for Design Elements Element 1, 3 and 6. In this example, the calculated verification result for Design Element 1 uses measurement data from measurement Locations A and D, the calculated verification result for Design Element 2 uses measurement data from measurement Location A, the calculated verification result for Design Element 3 uses measurement data from measurement locations A, C and D, the calculated verification result for Design Element 4 uses measurement data from measurement Locations B and C, the calculated verification result for Design Element 5 uses measurement data from measurement Location B, and the calculated verification result for Design Element 6 uses measurement data from measurement Location D.

Various embodiments for generating sample directions at operation 212 in FIG. 2 and/or FIG. 4 are described herein, with reference to one or more of FIGS. 5-7E. In some embodiments, in accordance with a first approach, sample directions are generated based on sample points on the selected design element. In further embodiments in accordance with a second approach, sample directions are generated based on sample direction points on a projection surface. In one or more embodiments, a set of sample directions generated at operation 212 includes one or more sample directions generated in accordance with the first approach, and one or more further sample directions generated in accordance with the second approach.

In some embodiments, the virtual device location is the location in the design model that corresponds to the physical location of the measurement device in the scene. For example, as described herein with respect to FIG. 3A, the virtual device location 325 is the location in the design model 320 that corresponds to the physical location of the measurement device 100 in the scene 310. In some embodiments, the virtual look direction to a point in the design model is the direction from the virtual device location to the point in the design model.

In some embodiments, in accordance with the first approach, a plurality of Sample Directions is automatically generated by determining a set of Sample Points on the Design Element and using the look directions from the virtual device location to the Sample Points to determine a set of Sample Directions.

In some embodiments, determining a set of Sample Points on a Design Element is performed by obtaining a polygonal mesh corresponding to the Design Element, choosing a set of polygons in this polygonal mesh, and selecting a set of Sample Points associated with that set of polygons. In some embodiments, the polygons in the mesh are triangles. Other polygon configurations, e.g., quadrilateral, are within the scopes of various embodiments. In some embodiments, the polygonal mesh is the same mesh as is used to visualize the Design Element. For example, the design element as obtained at operation 204 includes one or more curved surfaces and/or is not yet presented by a polygonal mesh. In this situation, the processor is configured to execute an algorithm to find a polygonal approximation to the curved surface geometry of the design element to obtain a corresponding polygonal mesh to be used for determining sample points. In some embodiments, a point (e.g., Sample Point) associated with a polygon is a point mathematically determinable for that polygon by a predetermined algorithm.

In some embodiments, the Sample Point associated with a polygon is a vertex of the polygon, or another geometrically definable point (e.g., the midpoint of the longest edge of the polygon).

In some embodiments, one or more Sample Points associated with a polygon are chosen randomly within the boundary of the polygon. The concept of "random" or "randomly" in accordance with some embodiments is described herein.

In some embodiments, a grid of points is placed over a polygon, and one or more Sample Points associated with the polygon are chosen from the grid. This approach is similar to that described with respect to FIGS. 6B and 7B-7E.

In some embodiments, the Sample Point associated with a polygon is a center of the polygon. For example, the Sample Point associated with a triangle is a center of the triangle. A person ordinarily skilled in the art will be aware that there are many different definitions of the center of a triangle (such as, the centroid, the circumcenter, the incenter, or the orthocenter) that can be used to define the location of a Sample Point associated with a triangle. In at least one embodiment, those center definitions where the center is guaranteed not to lie outside the boundary of the triangle are more useful than those center definitions where the center can be outside the triangle. In some embodiments, a center that lies outside the triangle is used to define the location of a Sample Point along the nearest boundary of the triangle. An example polygon mesh is described with respect to FIG. 5.

Figure 5:
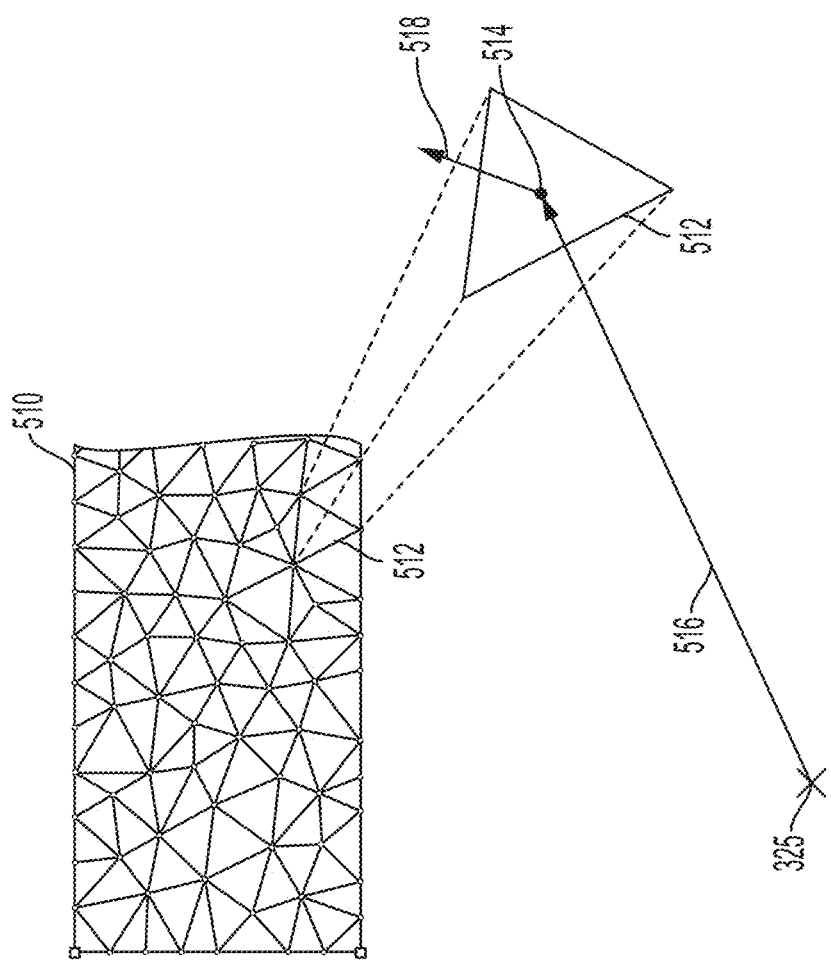
FIG. 5 is a diagram schematically showing a polygonal mesh and a center of a polygon in the polygonal mesh, in accordance with some embodiments.

FIG. 5 is a diagram schematically showing a polygonal mesh 510 and a center of a polygon in the polygonal mesh 510, in accordance with some embodiments. In the example configuration in FIG. 5, the polygonal mesh 510 is a mesh used to visualize a Design Element, e.g., a design element selected at operation 208. The polygonal mesh 510 comprises a plurality of polygons which are triangles in the example in FIG. 5. Other polygon configurations, e.g., quadrilateral, are within the scopes of various embodiments. One of the polygons, i.e., polygon 512, is illustrated in an enlarged view. The polygon 512 has a polygon center 514. A look direction 516 is the direction from the virtual device location 325 to the polygon center 514. If the polygon center 514 of the polygon 512 is selected as a Sample Point, the look direction 516 becomes a Sample Direction in which a measurement is to be taken, as described with respect to FIG. 3D. The polygon 512 has a normal vector 518 perpendicular to the plane defined by the vertexes of the polygon 512. Although the normal vector 518 in FIG. 5 is illustrated as passing through the polygon center 514, other arrangements are within the scopes of various embodiments. A dot product of the look direction 516, which is a vector from the virtual device location 325 to the polygon center 514, and the normal vector 518 is a scalar value that can be negative or positive and that can be used to classify whether the polygon 512 is facing towards or away from the virtual device location 325.

In some embodiments, where a set of polygons are chosen, the polygons are chosen randomly, and the polygon centers (or other geometrically definable points) of the randomly chosen polygons are selected as Sample Points. In some embodiments, the concept of "random" or "randomly" covers not only a truly random number sequence, but also a sequence of so-called pseudo-random numbers. Pseudo-random numbers are known in the art to be generated on a computer by a "pseudo-random number generator" in a reproducible sequence according to an algorithm.

In some embodiments, a set of polygons is chosen randomly with all polygons in the mesh weighted equally. In some embodiments, this random choice is made by weighting the polygons by their surface area. In some embodiments, this random choice is made by weighting each polygon by a weight that depends on the angle between the polygon's normal vector (e.g., 518 in FIG. 5) and the look direction (e.g., 516 in FIG. 5) to a point associated with the polygon such as the polygon's center. In some embodiments, multiple factors are included in a weighting scheme.

In some embodiments, the polygons are chosen by sorting the polygons and using polygons in that order to determine Sample Points, until enough Sample Points have been calculated.

In some embodiments, polygon sorting is performed according to each polygon's surface area.

In some embodiments, polygons are classified according to whether they are facing towards or away from the measurement device (the virtual device location in the space of the design model) by determining whether the dot product between the polygon's normal vector and the virtual look direction to a point on the polygon is negative or positive. In some embodiments, polygons facing away from the measurement device are omitted from consideration when choosing polygons, since points on these polygons will not be visible to the measurement device if the Object being measured is perfectly placed.

In some embodiment, a negative dot product indicates that the polygon is facing towards the virtual device location, whereas a positive dot product indicates that the polygon is facing away from the virtual device location. In other embodiments, a positive dot product indicates that the polygon is facing towards the virtual device location, whereas a negative dot product indicates that the polygon is facing away from the virtual device location.

In some embodiments, polygons for which the dot product is zero are classified as facing towards the virtual device location, i.e., towards the measurement device. In other embodiments, such polygons are classified as facing away from the virtual device location, i.e., away from the measurement device. In further embodiments, such polygons are classified as facing transverse to the virtual device location, i.e., transverse to the measurement device.

In some embodiments, a line-of-sight analysis is performed to determine if a potential Sample Point will be visible to the measurement device if the Object being measured is perfectly placed. The potential Sample Point is rejected if it would not be visible to the measurement device. As a result, in at least one embodiment, it is possible to reduce the number of Sample Points to be considered for generating Sample Directions. In some embodiments, a line-of-sight analysis comprises ray-tracing in the design model. In an example, the processor is configured to look for occlusions just from the selected design element (e.g., the top flange of an I-Beam occluding the bottom flange if the virtual device location is above the I-beam). In another example, the processor is configured to look for occlusions from other or all the design elements in the design model.

In some embodiments, in accordance with the second approach, a plurality of Sample Directions is automatically generated by determining a set of Sample Direction Points on a projection surface of the Design Element, and using the look directions from the virtual device location to the Sample Direction Points to determine a set of Sample Directions. In at least one embodiment, the set of Sample Direction Points is selected from a larger set of potential Sample Direction Points. There are several ways to obtain a set of potential Sample Direction Points, in accordance with various embodiments. In a first way in accordance with some embodiments, a set of potential Sample Direction Points is determined by a grid of potential Sample Direction Points, as described with respect to FIGS. 6A, and 7A-7E. In a second way in accordance with further embodiments, a set of potential Sample Direction Points is projected from the Design Element onto the projection surface, as described with respect to FIG. 6B. In one or more embodiments, a set of potential Sample Direction Points includes one or more potential Sample Direction Points generated in accordance with the first way, and one or more further potential Sample Direction Points generated in accordance with the second way.

In some embodiments, a 2D projection of the geometry of the selected Design Element from the point of view of the virtual device location is determined. In some embodiments, a planar projection is used, i.e., the projection surface is planar. A projected point is calculated by choosing a projection plane and projecting points in the Design Element geometry into the projection plane by drawing a line from the virtual device location through the point in the Design Element geometry and finding the intersection of that line with the projection plane.

In some embodiments, a combination of more than one projection planes is used as the projection surface to account for situations where one or more points in the Design Element geometry cannot be projected into a single projection plane. In some embodiments, a spherical projection is used where a projected point is calculated by choosing, as the projection surface, a projection sphere centered on the virtual device location and projecting points in the Design Element geometry into the projection sphere by drawing a line from the virtual device location and the point in the Design Element geometry and finding the intersection of that line with the projection sphere. In some embodiments, a "projected image" is defined as the set of all points on one or more projection surfaces that are the projection of a point in the Design Element geometry into the projection surface(s).

In some embodiments, the geometry of the Design Element is analyzed to identify a set of 1-3 orthogonal "Principal Axes". In some embodiments, these are the Cartesian X, Y and Z directions. In some embodiments, these axes are associated with an oriented bounding box. In some embodiments, these axes are obtained by examining the geometries of the polygons comprising a polygonal mesh corresponding to the Design Element. In some embodiments, a histogram is constructed over the space of all possible normal directions, with each polygon contributing a weight that is calculated from its surface area to the histogram cell associated with the normal vector of the polygon, and histogram cells with a local maximum in weight are used to determine one or more of the Principal Axes. For example, the principal axes for a cubic Design Element using this algorithm might correspond to the 3 normal directions of the faces (and their negatives), i.e., top/bottom, left/right, and front/back. In some embodiments, an extrusion direction is determined and is used as one of the Principal Axes. Other configurations for determining Principal Axes are within the scopes of various embodiments.

In some embodiments, a Sample Point is classified by determining the normal to the surface of the Design Element at the Sample Point and determining which Principal Axis has a direction closest to that normal. In some embodiments, each Sample Point is characterized by a set of weight values each for a corresponding one of the Principal Axes. In some embodiments, a weight value is based on the dot product between the normal to the surface of the Design Element at the Sample Point and the direction of the Principal Axis. In some embodiments, the weight value is the square of this dot product. In some embodiments, the sum of the weights for all Principal Axes is one. An example of a Sample Point is the polygon center 514, and an example of the normal to the surface of the Design Element at the Sample Point is the normal vector 518 as described with respect to FIG. 5.

In some embodiments, when a 2D projection of the geometry of the Design Element on a projection surface has been determined, a 2D bounding region in the projection surface is calculated such that all points in the projected image lie within the bounding region. In some embodiments, this 2D bounding region is an axis-aligned bounding box. In some embodiments, this 2D bounding region is an oriented bounding box. In some embodiments, this 2D bounding region is a circle or an ellipse.

In some embodiments, a Sample Direction Point is defined as a point on the 2D projection surface, and a corresponding Sample Direction is defined as the direction in 3D space from the virtual device location to the Sample Direction Point on the projection surface. One ordinarily skilled in the art will understand that a set of Sample Direction Points is isomorphic to the corresponding set of Sample Directions, and that discussion of an element of either set implies a corresponding discussion of the corresponding element in the other set. In particular, picking a set of Sample Direction Points is equivalent to picking a set of Sample Directions and vice-versa.

In some embodiments, a 2D grid of potential Sample Direction Points is created in the projection surface. In some embodiments, the parameters of this grid are calculated based on the geometry of the 2D bounding region. In some embodiments, the axes of the grid are aligned with the axes of the 2D bounding region. In some embodiments, the 2D bounding region is a 2D bounding box or 2D bounding ellipse, and the axes of the 2D grid are aligned with the axes of the 2D bounding region. In some embodiments, information about a set of Principal Axes for the 3D Design Element are used to determine the parameters of the grid. In some embodiments, the potential Sample Direction Points are filtered to only contain potential Sample Direction Points which lie within the projected image.

In some embodiments, a set of potential Sample Direction Points is created based on a 2D projection, as described above. In some embodiments, a set of potential Sample Direction Points is created based on a polygonal mesh corresponding to the Design Element and determining one or more geometrically defined 3D points for each polygon as described above, and then projecting those 3D points into a projection surface. In some embodiments, the weights of these projected points is based on the 2D area of the projected polygon.

In some embodiments, Sample Direction Points are chosen randomly from the potential Sample Direction Points.

In some embodiments, a set of Sample Direction Points that determine the set of Sample Directions is chosen from the potential Sample Direction Points by selecting points that are far away from each other in the 2D projection space in order to increase the moment arm used to determine angular rotations.

In some embodiments, the set of Sample Direction Points is chosen from the potential Sample Direction Points by selecting points that are no closer than some (2D) distance threshold to the boundary of the Projected Image, so that if the as-built object being measured is mis-placed in the real-world scene, the measurement directions (or Sample Directions) are still likely to intersect the real-world as-built object.

In some embodiments, Sample Directions corresponding to Sample Direction Points that are outside of but close to the boundary of the Projected Image are included in the set of Sample Directions to be measured, so that if the as-built object being measured is mis-placed in the real-world scene, some of these measurement directions (or Sample Directions) are still likely to intersect the real-world as-built object, giving a lower bound on the projected displacement of the real-world object.

In some embodiments, the set of Sample Direction Points corresponding to the set of Sample Directions is chosen so that the points both are in the Projected Image and are as far away from each other as possible. In some embodiments, the parameters of a 2D grid of potential Sample Direction Points are tuned so that the number of grid points (e.g., the number of potential Sample Direction Points) in the Projected Image is the number of Sample Points desired. In some embodiments, multiple criteria for choosing Sample Direction Points are used.

In some embodiments, an attempt is made when choosing Sample Directions to distribute the surface normal directions at the corresponding Sample Points on the object evenly between the Principal Axes so that the displacement of the object will be well measured in all directions. In some embodiments, this is performed by dividing the number of desired Sample Directions evenly between the Principal Axis directions, partitioning the potential Sample Direction Points based on the corresponding potential Sample Point's surface normal direction as described above, and selecting Sample Direction Points independently for each of the Principal Axis directions. In some embodiments, each Sample Point has a weight for each of the Principal Axis directions and Sample Directions are chosen to balance the corresponding weights between the Principal Axis directions.

For some orientations of the Design Element relative to the virtual device location, the set of surface normals (e.g., normal vectors) at points that are visible from the virtual device location might not span the Gauss Sphere of all possible surface normals. For example, a point that is displaced outward from a cube along a line perpendicular to any point on a face of the cube will only be able to see that face of the cube, and the only surface normal that can be observed will be the surface normal of that face. In some embodiments, the algorithm for choosing Sample Directions is configured to detect the configuration and adjust the number of Sample Directions to be measured and/or their allocation among the Principal Axes. For example, if the algorithm called for 12 Sample Directions when surface normals in all 3 Principal Axis directions (4 Sample Directions per Principal Axe direction) are visible in the case of the cube example where only one face is visible, the algorithm might reduce the number of Sample Directions to 4 or might assign all 12 Sample Directions to the direction of the visible face, or choose a number of Sample Directions that is a compromise between these strategies.

Figure 6B:
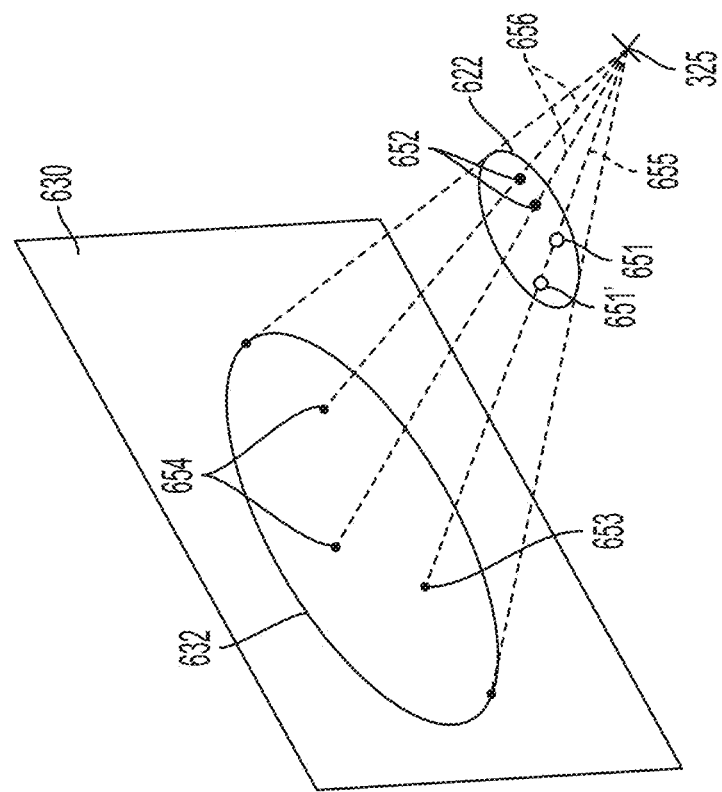
FIG. 6B is a diagram schematically showing a further example for determining potential sample direction points on a projection surface on which a design element is projected, in accordance with some embodiments.
Figure 6A:
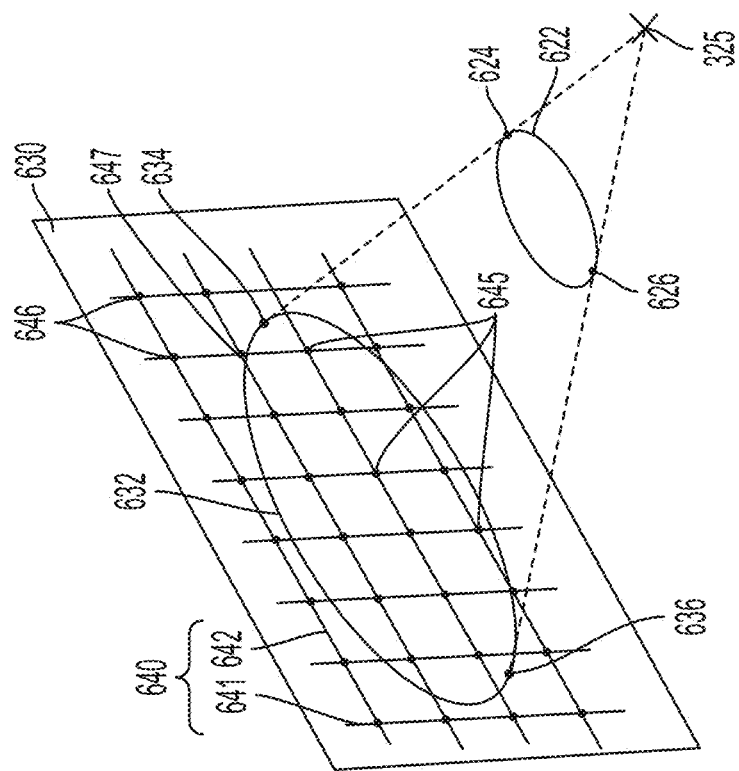
FIG. 6A is a diagram schematically showing an example for determining potential sample direction points on a projection surface on which a design element is projected, in accordance with some embodiments.

A specific example for the above described process of determining potential Sample Direction Points on a projection surface by using a grid of potential Sample Direction Points, in accordance with some embodiments, is described herein with respect to FIG. 6A.

In FIG. 6A, a Design Element 622 is projected from the virtual device location 325 onto a projection plane 630 to obtain a corresponding projected image 632. Specifically, points 624, 626 on the geometry of the Design Element 622 are projected onto the projection plane 630 by lines from the virtual device location 325 through the points 624, 626 in the geometry of the Design Element 622, and finding intersections 634, 636 of the lines with the projection plane 630. The intersections 634, 636 collectively define the geometry of the projected image 632. The illustration of the Design Element 622 in FIG. 6A is simplified. In some embodiments, the Design Element 622 is a 3D model being projected into a 2D projected image 632. A grid 640 including columns 641 and rows 642 is laid over the projected image 632. The grid 640 includes potential Sample Direction Points 645, 646, 647 at intersections of the columns 641 and rows 642.

In some embodiments, the potential Sample Direction Points 646 outside the projected image 632 are discarded, and the potential Sample Direction Points 645 inside the projected image 632 are considered to be selected as Sample Direction Points. In at least one embodiment, a smaller set of Sample Direction Points is selected from the potential Sample Direction Points 645 inside the projected image 632, using one or more of the strategies described herein. An example of further selecting Sample Direction Points from a set of potential Sample Direction Points 645 inside the projected image 632 is described with respect to FIGS. 7A-7E.

In some embodiments, a potential Sample Direction Point 647 outside but sufficiently close to the projected image 632 is selected as a Sample Direction Point. A Sample Direction from the virtual device location 325 to the Sample Direction Point 647 will miss, i.e., will not intersect, the 3D Design Element 622. It is, however, expected that the Sample Direction might still hit the as-built Object and result in a measured point when the as-built Object is not perfectly installed.

A specific example for the above described process of determining potential Sample Direction Points on a projection surface by projecting potential Sample Direction Points on the projection surface, in accordance with some embodiments, is described herein with respect to FIG. 6B.

In FIG. 6B, the Design Element 622, e.g., a 3D model, is projected from the virtual device location 325 onto the projection plane 630 to obtain the 2D projected image 632, as described with respect to FIG. 6A. A plurality of Sample Points 651, 652 are determined for corresponding polygons in a polygonal mesh representing the Design Element 622. In an example, each of the Sample Points 651, 652 is determined as a polygon center of the corresponding polygon, as described with respect to FIG. 5. The Sample Points 651, 652 are projected from the virtual device location 325 onto the projection plane 630, resulting in a corresponding set of potential Sample Direction Points 653, 654. A smaller or reduced set of Sample Direction Points is selected from the set of potential Sample Direction Points 653 in one or more manners, e.g., randomly, using a weighting scheme, spreading out the Sample Direction Points, or the like, as described herein.

In some embodiments, because the Design Element 622 is a 3D model, each of potential sample directions 655, 656 from the virtual device location 325 to a Sample Point passes through the Design Element 622 an even number of times, except for rare situations where the potential sample direction is a tangent line to a surface of the Design Element 622. For example, in FIG. 6B, the potential sample direction 655 from the virtual device location 325 to the Sample Point 651 passes through the Design Element 622 twice, at the Sample Point 651 and another intersection point 651' where the potential sample direction 655 again intersects the Design Element 622. For simplicity, intersection points other than the Sample Points 652 on the potential sample directions 656 are omitted.

In some embodiments, the Sample Points on the Design Element 622 are given weights in accordance with one or more weighting schemes as described herein. For example, each of the Sample Points is given a weight based on the corresponding polygon's normal vector. Based on the weights corresponding to normal vectors, a narrowed set of Sample Points is selected, for example, to exclude Sample Points located on faces of the Design Element that do not face the virtual device location 325, and/or to include a sufficient number of Sample Points on each face of the Design Element that faces the virtual device location 325. The narrowed set of Sample Points is projected onto the projection plane 630 to obtain a corresponding set of Sample Direction Points. The Sample Direction Points are given weights in accordance with one or more weighting schemes as described herein. For example, each of the Sample Direction Points is given a weight based on closeness to the boundary of the projected image 632. Based on the weights corresponding to closeness to the boundary of the projected image 632, a narrowed set of Sample Direction Points is selected, for example, to spread out the Sample Direction Points. The selected Sample Direction Points correspond to the sample directions to be used for subsequent automatic measurements. Accordingly, in at least one embodiment, sample directions are selected based on the weights of the corresponding Sample Points and Sample Direction Points.

In the above described example, the number of Sample Points is narrowed down before projection on a projection surface. Other arrangements are within the scopes of various embodiments. For example, in one or more embodiments, all Sample Points are projected onto the projection plane 630 to obtain corresponding Sample Direction Points which are given weights as described herein. Sample directions are then selected based on the weights of the corresponding Sample Points and Sample Direction Points.

FIGS. 7A-7E are diagrams schematically showing various stages in an example for determining sample direction points and sample directions, in accordance with some embodiments.

Figure 7A:
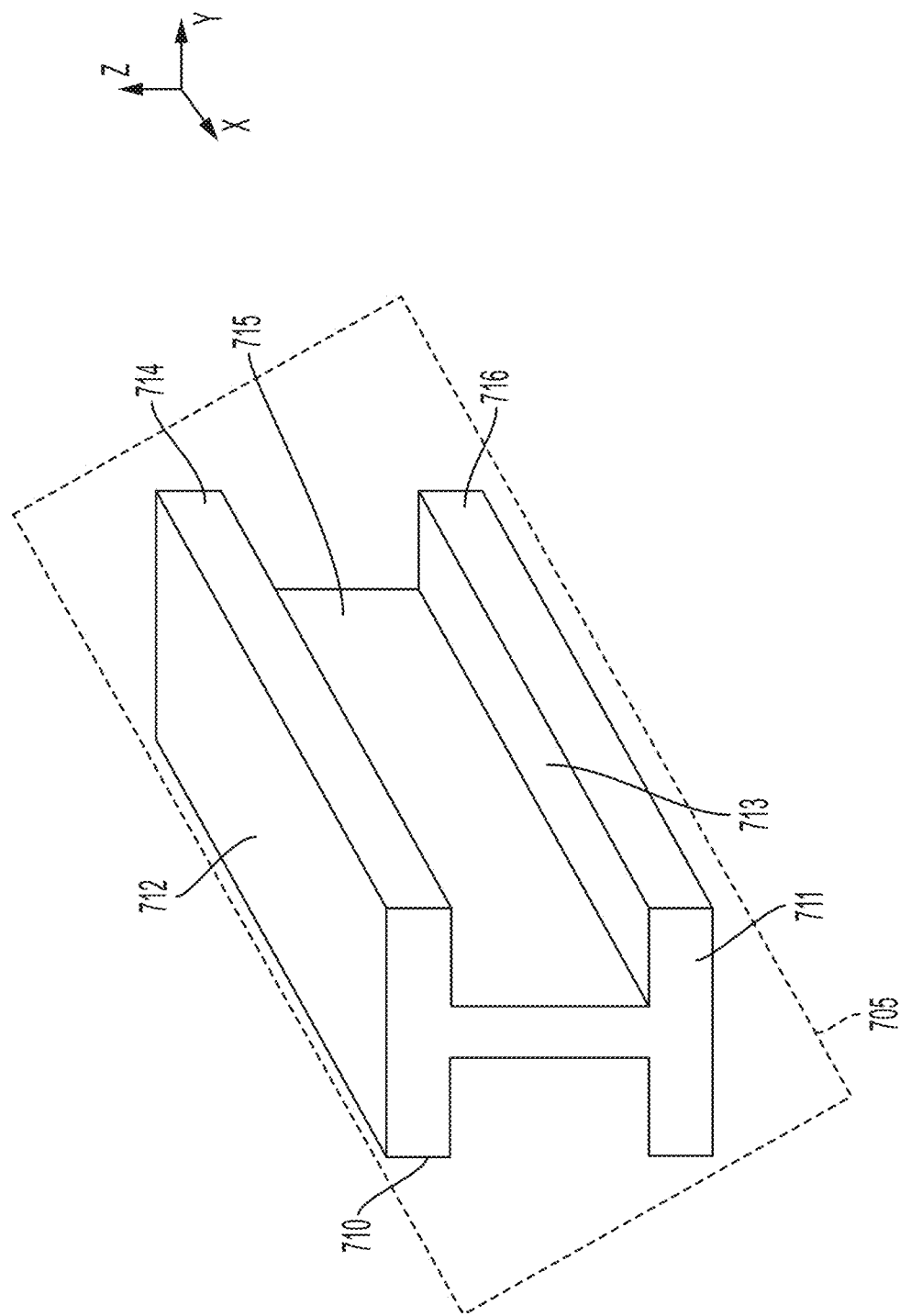

In FIG. 7A, the Design Element is an I-Beam, and a planar projection has been performed to create a 2D projected image 710 on a projection plane 705. In some embodiments, the projected image 710 is created in a manner similar to the projected image 632, as described with respect to FIG. 6A. Six faces 711-716 of the I-Beam are visible from the virtual device location (not shown). Principal Axes are obtained by calculating a 3D oriented bounding box of the Design Element. The six visible faces are classified according to the Principal Axes, with a face 761 facing the front (the extrusion direction) and associated with a first Principal Axis X, two faces 712, 713 facing "up" and associated with a second Principal Axis Z, and three faces 714, 715, 716 facing "right" and associated with a third Principal Axis Y.

Figure 7B:
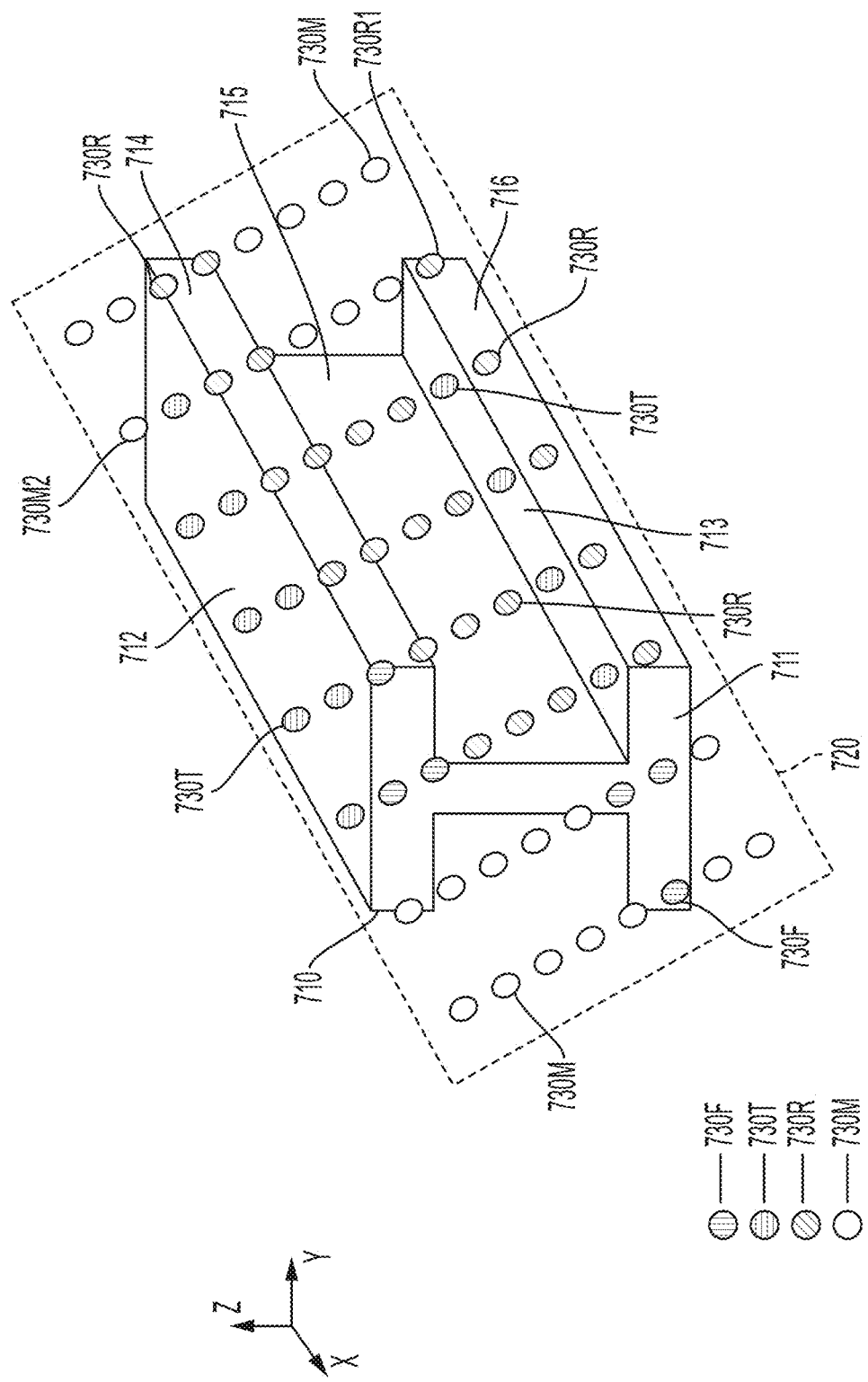

In FIG. 7B, a 2D oriented bounding box 720 of the projected image 710 is calculated, and a set of potential Sample Direction Points 730F, 730T, 730R, 730M is placed at the centers of a 8×8 rectangular grid of cells (not shown). For simplicity, the potential Sample Direction Points 730F, 730T, 730R, 730M (commonly referred to herein as "730") are illustrated as circles in FIG. 7B. However, each circle is intended to visually indicate the point at its center. These potential Sample Direction Points are partitioned or classified according to the directions of the normals (normal vectors) of the corresponding 3D faces into a set of Front points 730F on the front face 711, a set of Top points 730T on the first top face 712 and second top face 713, a set of Right points 730R on the first right face 714, second right face 715, and third right face 716, along with a set of Miss points 730M which correspond to measurement directions (Sample Directions) that will not intersect with the as-built object if it is perfectly placed. In this example, twelve Sample Directions, i.e., twelve Sample Direction Points, are selected by selecting four points from each of the sets of Front points 730F, Top points 730T, and Right points 730R. For each set of potential Sample Direction Points associated with a particular Principal Axis direction, a new 2D oriented bounding box is calculated.

Figure 7C:
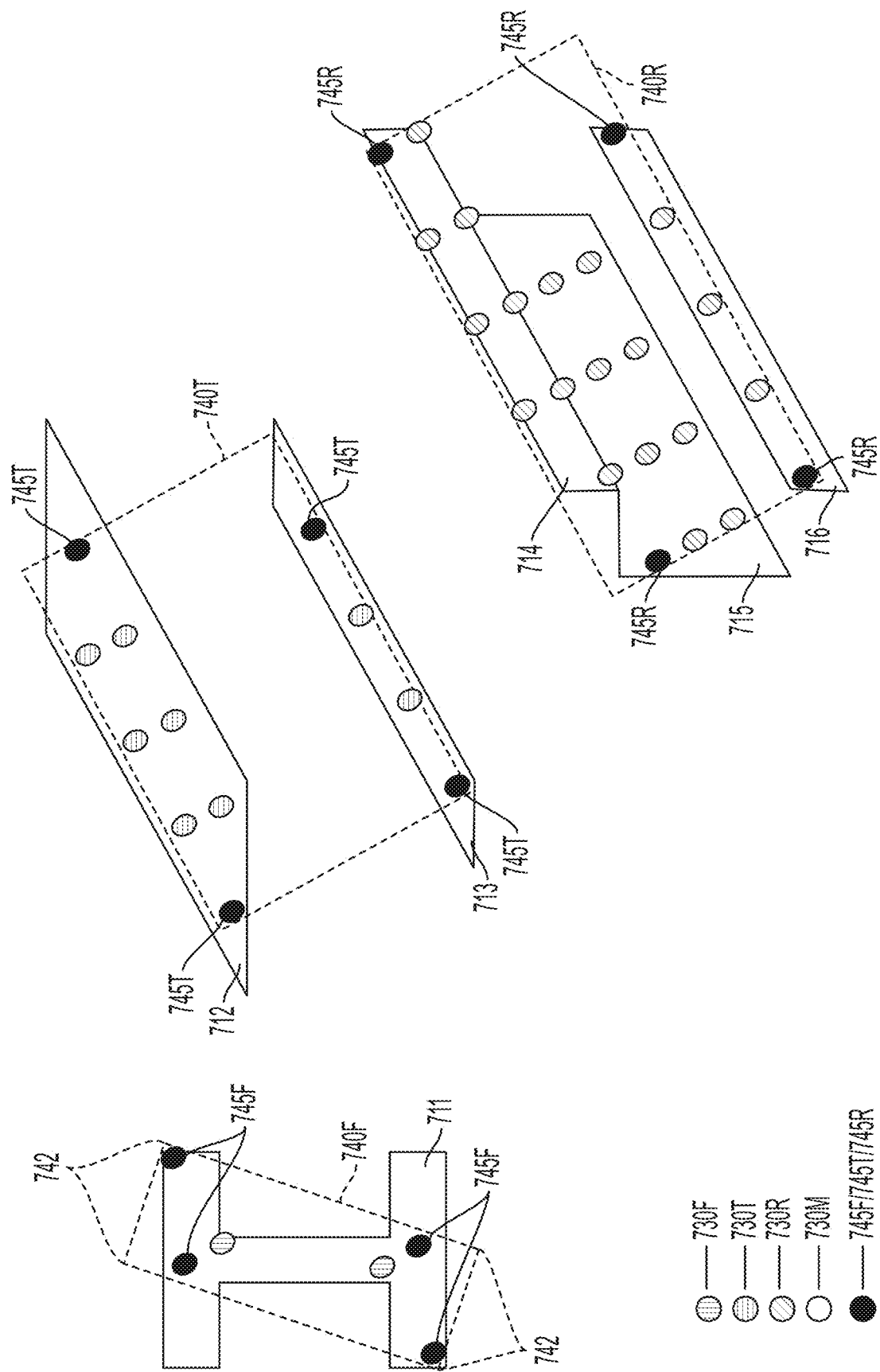

In FIG. 7C, for simplicity, the three new 2D oriented bounding boxes and the corresponding faces and sets of points are illustrated separately. A front bounding box 740F corresponds to the Front points 730F, a top bounding box 740T corresponds to the Top points 730T, and a right bounding box 740R corresponds to the Right points 730R. For each of the four corners 742 of front bounding box 740F, the closest potential Sample Direction Point 730F is chosen as a member of the set of twelve Sample Direction Points, and is relabeled as 745F. This procedure is repeated for bounding boxes 740T and 740R.

In FIG. 7D, the boxes 740F, 740T and 740R and the corresponding faces and sets of points including the selected Sample Direction Points 745F, 745T, 745R are illustrated in the combined state of the projected image 710.

In FIG. 7E, the boxes 740F, 740T and 740R and unselected potential sample direction points are omitted. FIG. 7E shows the projected image 710 and twelve selected Sample Direction Points 745F, 745T, 745R. When the twelve selected Sample Direction Points 745F, 745T, 745R are connected with the virtual device location (not shown), twelve corresponding Sample Directions are obtained and used for measurements, as described with respect to FIG. 3D.

The described process of determining potential Sample Direction Points for Sample Directions is a simplified example. Other arrangements are within the scopes of various embodiments. For example, the grid of potential Sample Direction Points 730 was limited in size to 8×8 in order to create a legible figure. In some embodiments, a grid of potential Sample Direction Points might be, e.g., a 128×128 grid, or the grid size might be chosen dynamically based on the particular 2D projected image.

In at least one embodiment, potential sample direction points that are too close to the boundary of a face, such as point 730R1 in FIG. 7B, might be classified into the set of Miss points 730M, and not considered to be selectable as a Sample Direction Point.

In one or more embodiments, potential sample direction points that are outside the projected image 710 but are sufficiently close to the boundary of the projected image 710, such as point 730M2 in FIG. 7B, might be included in one of the sets of Front points 730F, Top point 730T, or Right points 730R, based on the classification of the nearest face as discussed above. In this particular case, the point 730M2 in FIG. 7B would be included in the set of Top points 730T.

Further the described choice of the number of Sample Direction Points to be chosen and the manner in which they are chosen are examples. Other arrangements are within the scopes of various embodiments. For example, instead of selecting a point closest to each of the four corners of a bounding box, a point closest to each of the points ⅔ of the way between the center of the rectangular bounding box and each of the four corners of the bounding box is selected as a Sample Direction Point. Note that this enumeration of simplifications is provided as an example and is not intended to be limiting.

The process described with respect to FIGS. 7A-7E is an example in which surface normals and/or sample points are determined without involving a polygonal mesh. Other configurations are within the scopes of various embodiments. In some embodiments, the geometry of the design element is described by a B-Rep model in a solid modeling kernel library such as ACIS, developed by Spatial Corporation, running on the processor. Such solid modeling kernels are able to define the surface geometry of modeled objects (e.g., design elements) using B-Spline functions, analytic definitions (such as for planes, spheres, cylinders and tori), and procedurally (such as for the extrusion a curve along a path defined by another curve) and provide functions to perform operations such as calculating the intersection of a line with an object, calculating the normal vector and curvature at a point on a surface etc. In some embodiments, the processor executing an algorithm for choosing sample points uses the solid modeling kernel to provide information about the geometry of the design element and, once a set of sample points are chosen, to calculate the surface normal of the design element at each sample point. For example, the algorithm for choosing sample points might generate a uniform grid (in angular space) of candidate sample directions and, for each candidate sample direction, intersect a line emanating from the virtual device location in the candidate sample direction with the surface of the design element to determine a corresponding set of candidate sample points which can be further analyzed according to one or more of the methods described involving polygonal meshes herein. In another example, the processor executing an algorithm for choosing sample points might use the solid modeling kernel to attempt to find sample points in areas of low curvature, or in areas of high curvature.

In some embodiments, a measurement device, such as a total station, is used in a verification system or method for construction verification. The system or method automatically determines sample directions for a design element, automatically controls the measurement device to take measurements in the determined sample directions with a number of measure points sufficient for the system or method to automatically compute a rigid body transform for mapping the design element onto the measured points which represent a real world as-built object corresponding to the design element. A report of installation accuracy is automatically generated based on the computed rigid body transform. In at least one embodiment, a handful of measured points, or sample directions, e.g., about 12 points, are sufficient for high accuracy verification including consideration of translation, rotation, noise (outliers), statistical uncertainty, or the like. In some embodiments, the verification process is automatically performed upon a user's selection of one or more design elements, without further user intervention. The selection of more than one design elements for verification permit batch-processing which reduces time and requirement for user supervision. In at least one embodiment, despite that the system or method are configured to be fully automated, various options are provided along the verification process to guide or prompt the user to take manual control and/or measurement, where desirable, to improve verification accuracy and or processing time.

In some embodiments, the verification system or method uses known 3D design models to automatically aim a total station where as-built objects are expected to be located. The total station is then controlled to automatically shoot a number of points to validate that the as-built object or objects has/been installed correctly. In some embodiments, the verification system accounts for typical or expected installation errors to improve the chances of hitting a target (i.e., the as-built object to be verified).

In some embodiments, the verification system automatically selects optimal points for the total station to shoot using one or more of the criteria described herein. In one or more embodiments, points are selected in the middle of large, flat surfaces as these points are more tolerant to translation mistakes. In one or more embodiments, points are selected near the extreme ends because an elongated lever arm of measurements are more robustly able to lock in subtle rotations. In one or more embodiments, points are selected that are not near the extreme ends but near the middle of an object because these points are less likely to be occluded by another object in the real world scene. In one or more embodiments, points are selected on different orthogonal surfaces because three orthogonal surfaces robustly locks down the location/rotation of an object.

In some embodiments, the verification system automatically selects random key points, or automatically selects random sample directions, to shoot. In some embodiments, a key point is a sample point or a sample direction point. In at least one embodiment, a set of key points includes one or more sample points and one or more sample direction points.

In some embodiments, the verification system automatically selects a grid of key points distributed across the surface of the object to shoot.

In some embodiments, the verification system generates a variable number of key points depending on whether the user wants to check XY translation, Z translation, or rotation installation errors. Fewer key points means faster checking.

In some embodiments, the verification system does not generate all key points or sample directions at once. The verification system generates key points or sample directions incrementally as new measurements arrive from the instrument and the verification system has better information about where the object is located. For instance, the verification system requests additional points or sample directions until the fitting algorithm converges to within preset thresholds. The verification system reports an error if the fitting algorithm does not converge within the specified timeframe.

In some embodiments, the verification system optimizes the key point or sample direction acquisition sequence to minimize instrument traversal time between key points or sample directions.

In some embodiments, the verification system computes fit, e.g., a rigid body transform, and reports whether the object is installed within a specified installation error limit or not.

In some embodiments, the verification system includes a fault-tolerant algorithm that can either ignore occluded shots or warn the user when there are likely occlusions: e.g., if a crate is occluding a column, the verification system will not report the column as missing or incorrectly installed. In at least one embodiment, the verification system requests a user to perform a manual measurement, or move the measurement device to a different measurement location to avoid occlusion.

In accordance with an embodiment, the verification system pre-filters likely occlusions based on line-of-sight calculations between the measurement device and the model.

In some embodiments, if a shot is unexpectedly occluded, the verification system requests another substitute key point or sample direction.

In accordance with an embodiment, the verification system repeats the entire acquisition sequence to try to filter out any temporary occlusions such as workers moving between the instrument (e.g., the measurement device) and the object.

In some embodiments, the verification system computes the as-built position of an object. In at least one embodiment, the verification system finds the transform that minimizes the distance between the total station's measured points and the surfaces in the design element (e.g., a building information modeling (BIM) object).

In some embodiments, the verification system includes a fault-tolerant algorithm that ignores occlusion points and fits to the remaining points, e.g., if a crate is covering part of a column the verification system ignores shots on the crate but still fits the column to the remaining valid measured points.

In some embodiments, the verification system constrains translation and/or rotation to specific axes, e.g., the verification system constrains the rotation of a column so that it retains idealized verticality in the design model even though the column may have been installed a hair off-vertical.

An embodiment of the verification system updates the design model to reflect the as-built location of the object. For example, upon completion of transform calculation, the obtained transform maps the design element onto the measured points, resulting in an As-Built Design Element which is used to update the design model.

In accordance with an embodiment, the results of the verification process are displayed or reported on a tablet or another appropriate display device. The points shot by the total station are overlaid on the 3D design model. The individual shots are colored in accordance with the distance from the object's surface in the 3D design model. For example, a green shot represents a shot of a point on an object in the installation, where the shot is near (within a predetermined threshold distance) to where point on the object in the 3D design model is predicted. Red shots represent shots of points on an object in the installation that are far (outside of a predetermined threshold distance) from where the points on the objects in the 3D design model are predicted. The shots are labelled with the distance from the predicted location.

In some embodiments, the perspective of the total station is rendered and displayed on the tablet. This allows in-field interpretability and troubleshooting. For instance, if the shots taken near the bottom of a column are red, denoting that they are distant from where they were expected to be, and the shots taken near the top of a column are green, denoting that they are close to where they are expected, a user is able to look at the physical column to recognize the error denoted by the red shots and observe that there are pallets stacked at the bottom that are obscuring the line of sight of the total station.

In some embodiments, using the rendered perspective of the total station overlaid on the 3D design model, plan, side and front views of an object are generated by the verification system. Shot measurements of the object are used to indicate translations and rotations around the building axes. The rendered object is texture mapped with an artificial heatmap of calculated distances between as-designed and as-built element positions.

In accordance with an embodiment, a visual overlay of a 3D model is generated by the verification system with a calibrated image from the total station. The augmented reality view informs users of possible installation errors that should be spot-checked. This enables easy in-field troubleshooting and validation of results. For example, overlaying the 3D design model on the rendered image along with the total station shot points (measured points) allows the user to identify bad shots, for example, shots that made measurements to a pallet rather than a column. In some embodiments, a record is created for every item with a picture showing the image from the perspective of the total station along with the overlay of the 3D object and the measured points collected by the total station.

In some embodiments, if the object is outside of expected installation error limits, the image is used to aim the total station at the spot where the object is installed. For example, if a column is shifted by six feet, it is not found by searching the area expected in the 3D design model. With the rendered perspective on the tablet, the user is able to touch the center of mass of the object on the rendered perspective. The angles and probe range to the touched point are calculated and the specified area is rescanned. The model object is texture mapped with the camera image and the location of key points and their deviation are embedded in the texture.

Compared to other approaches that use advanced surveying instruments, such as laser scanners, or the like for verification, the verification system or method in accordance with some embodiments uses a less expensive measurement device, e.g., a total station, requires far fewer measurements, less processing time, lower computing requirements, while still ensuring high verification accuracy.

Compared to further approaches that use total stations for construction verifications in a manual manner, the verification system or method in accordance with some embodiments is fully automated from total station aiming, shooting to measurement data processing and reporting. The verification system or method in accordance with some embodiments is fast, provides full 3D reports on translation and rotation, and makes it possible to batch-process multiple objects at once.

In some embodiments, at least one, or some, or all operations of the described methods are implemented as a set of instructions stored in a non-transitory medium for execution by a computer system, hardware, firmware, or a combination thereof. In some embodiments, at least one, or some, or all operations of the described methods are implemented as hard-wired circuitry, e.g., one or more ASICs.

It should be noted that this description is not an exclusive list of embodiments and further embodiments are possible. For example, combinations of the embodiments described herein, or portions of the embodiments described herein, may be combined to produce additional embodiments.

The described methods include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

In some embodiments, a system comprises a measurement device having an electronic distance measurement (EDM) instrument, and at least one processor coupled to the EDM instrument. The at least one processor is configured to localize the measurement device relative to a design model, the measurement device being physically located at a measurement location. The at least one processor is configured to automatically generate, for at least one design element in the design model, a plurality of sample directions. The at least one processor is configured to control the EDM instrument to automatically perform measurements in the plurality of sample directions. The at least one processor is configured to generate and output a verification result indicating a relation between the at least one design element and at least one object corresponding to the at least one design element, based on a shape of the at least one design element and measurement data of the measurements.

In some embodiments, a method of verifying an object built in accordance with a design element in a design model comprises localizing a measurement device relative to the design model to determine a virtual device location of the measurement device in the design model; automatically generating one or more sample directions extending from the virtual device location toward the design element; controlling the measurement device to perform automatic measurements in the one or more sample directions; calculating a verification result to match, by a transform of the design element, the design element with one or more measured points obtained in the automatic measurements; and outputting information about the verification result.

In some embodiments, a computer program product comprises a non-transitory computer-readable medium containing instructions which, when executed by at least one processor, cause the at least one processor to execute: localizing a measurement device relative to a design model, automatically generating, for the design element in the design model, a plurality of sample directions, controlling the measurement device to automatically perform measurements in the plurality of sample directions, and controlling a display to display, in a same screen, an image of the design element in the design model, a plurality of measured points obtained from the measurements and corresponding to the plurality of sample directions, and information on a displacement between each of the plurality of measured points and a corresponding sample point which is an intersection of a corresponding sample direction among the plurality of sample directions with the design element.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A system, comprising:
a measurement device having an electronic distance measurement (EDM) instrument; and
at least one processor coupled to the EDM instrument, and configured to:
  localize the measurement device relative to a design model, the measurement device being physically located at a measurement location,
  automatically generate, for at least one design element in the design model and based on a shape of the at least one design element as viewed from the measurement device, a plurality of sample directions,
  control the EDM instrument to automatically perform measurements in the plurality of sample directions, and
  generate a verification result indicating a relation between the at least one design element and at least one object corresponding to the at least one design element, based on the shape of the at least one design element and measurement data of the measurements,
wherein
the measurement device comprises a total station, and
the at least one processor is further configured to control the EDM instrument to automatically perform the measurements in the plurality of sample directions by controlling the total station to repeatedly perform:
  moving a shooting direction of the EDM instrument toward a sample direction among the plurality of sample directions, then
  stopping said moving in response to the shooting direction being aligned with the sample direction, and then
  causing the EDM instrument to perform a measurement along the sample direction, before moving the shooting direction of the EDM instrument toward a next sample direction among the plurality of sample directions.

2. The system of claim 1, further comprising:
a camera on the measurement device; and
a display, wherein
the at least one processor is further configured to
  control the camera to capture an image of the at least one object, and
  control the display to display an Augmented Reality (AR) image comprising the captured image of the at least one object, and an image of the at least one design element in the design model.

3. The system of claim 2, wherein
the at least one processor is further configured to
  control the display to, in response to user input, move the image of the at least one design element relative to the captured image of the at least one object.

4. The system of claim 2, wherein
the at least one processor is further configured to
  control the display to display the plurality of sample directions together with at least one of the captured image of the at least one object or the image of the at least one design element in the design model,
  in response to user input, modify at least one sample direction among the plurality of sample directions, and
  control the EDM instrument to automatically perform the measurements in the plurality of sample directions including the at least one modified sample direction.

5. The system of claim 1, wherein
the at least one processor is further configured to
receive user identification of at least one identifiable point on the at least one design element,
control the EDM instrument to perform a user-controlled measurement when the EDM instrument is directed, in accordance with user input, at at least one corresponding identifiable point on the at least one object, and
generate the verification result based on the measurement data of the automatically performed measurements and measurement data of the user-controlled measurement.

6. The system of claim 1, further comprising a display, wherein
the at least one processor is further configured to control the display to display, in a same screen,
an image of the at least one design element in the design model,
a plurality of sample points corresponding to intersections of the plurality of sample directions with the at least one design element, and
the measurement data corresponding to the plurality of sample points.

7. The system of claim 1, wherein
the at least one processor is further configured to
map a plurality of measured points in the measurement data and corresponding to the plurality of sample directions onto a space of the design model,
determine a transform of the at least one design element to match the at least one design element with the plurality of measured points mapped onto the space of the design model, and
output information about the determined transform as the verification result.

8. The system of claim 7, wherein
the transform comprises a rigid body transform, and
the verification result further comprises at least one of:
information about whether the rigid body transform is a pure translation or comprises a combination of a translation and a rotation,
information about a statistical uncertainty in a value of at least one parameter of the rigid body transform,
information about at least one of the measurements being a statistical outlier and discarded,
information about an estimate of a shape distortion of the model of the at least one object compared to the at least one design element, or
information about at least one parameter of the rigid body transform being unconstrained.

9. The system of claim 1, wherein the at least one processor is further configured to:
localize the measurement device relative to the design model, upon the measurement device being physically moved to a further measurement location,
automatically generate, for the at least one design element in the design model and based on the shape of the at least one design element as viewed from the measurement device at the further measurement location, a plurality of further sample directions,
control the EDM instrument to automatically perform further measurements in the plurality of further sample directions, and
generate and output the verification result, based on the measurement data of the measurements at the measurement location and further measurement data of the further measurements at the further measurement location.

10. A method of verifying an object built in accordance with a design element in a design model, the method comprising:
localizing a measurement device relative to the design model to determine a virtual device location of the measurement device in the design model;
automatically generating a plurality of sample directions extending from the virtual device location toward the design element;
controlling the measurement device to perform automatic measurements in the plurality of sample directions, by repeatedly performing
moving a shooting direction of the measurement device toward a sample direction among the plurality of sample directions, then
stopping said moving in response to the shooting direction being aligned with the sample direction, and then
causing the measurement device to perform a measurement along the sample direction, before moving the shooting direction of the measurement device toward a next sample direction among the plurality of sample directions; and
calculating a verification result to match, by a transform of the design element, the design element with one or more measured points obtained in the automatic measurements; and
outputting information about the verification result.

11. The method of claim 10, wherein
said generating the plurality of sample directions, said controlling the measurement device to perform the automatic measurements, and said calculating the verification result, and said outputting the information about the verification result are automatically performed in response to user selection of the design element in the design model for verification.

12. The method of claim 10, wherein said generating the plurality of sample directions comprises:
selecting a plurality of polygons among polygons of a polygonal mesh representing the design element;
determining a plurality of sample points each associated with a corresponding polygon among the plurality of selected polygons; and
generating the plurality of sample directions as directions correspondingly connecting the virtual device location with the plurality of selected sample points.

13. The method of claim 10, further comprising:
in response to a determination that the verification result is insufficient for verification of the design element, performing, at least once, a processing comprising:
controlling the measurement device to perform automatic measurements in one or more further sample directions; and
re-calculating the verification result to match the design element with the measured points obtained in the automatic measurements that have been performed,
wherein the processing is repeatedly performed until it is determined that the verification result is sufficient for verification of the design element.

14. The method of claim 13, wherein
the processing further comprises automatically generating the one or more further sample directions.

15. The method of claim 10, wherein said generating the plurality of sample directions comprises:

projecting a geometry of the design element on a projection surface to obtain a projected image;

generating a grid of potential sample direction points over the projected image;

selecting a plurality of sample direction points from the grid of potential sample direction points, based on the projected image; and generating the plurality of sample directions as directions correspondingly connecting the virtual device location with the plurality of selected sample direction points.

16. The method of claim 10, wherein said generating the plurality of sample directions comprises:

projecting a geometry of the design element on a projection surface to obtain a projected image;

determining a bounding box of the projected image;

generating a grid of potential sample direction points based on the bounding box;

selecting a plurality of sample direction points from the grid of potential sample direction points, based on the bounding box; and generating the plurality of sample directions as directions correspondingly connecting the virtual device location with the plurality of selected sample direction points.

17. The method of claim 10, wherein said generating the plurality of sample directions comprises:

determining a set of points associated with polygons in a polygonal mesh representing the design element;

projecting the set of points on a projection surface to obtain a corresponding set of potential sample direction points;

selecting a plurality of sample direction points from the set of potential sample direction points; and generating the plurality of sample directions as directions correspondingly connecting the virtual device location with the plurality of selected sample direction points.

18. The method of claim 10, wherein said generating the plurality of sample directions comprises:

determining a plurality of sample points on the surface of the design element;

based on a surface normal of the design element at each sample point, selecting a set of sample points from among the plurality of sample points; and generating the plurality of sample directions as directions correspondingly connecting the virtual device location with the selected sample points.

19. A computer program product, comprising a non-transitory computer-readable medium containing instructions which, when executed by at least one processor, cause the at least one processor to execute:

localizing a total station relative to a design model, automatically generating, for a design element in the design model and based on a shape of the design element as viewed from the total station, a plurality of sample directions, controlling the total station to perform automatic measurements in the plurality of sample directions, by repeatedly performing moving a shooting direction of the total station toward a sample direction among the plurality of sample directions, then stopping said moving in response to the shooting direction being aligned with the sample direction, and then causing the total station to perform a measurement along the sample direction, before moving the shooting direction of the total station toward a next sample direction among the plurality of sample directions, and generating a verification result to match, by a transform of the design element, the design element with one or more measured points obtained in the automatic measurements.

20. The system of claim 19, wherein the at least one processor is further configured to map a plurality of measured points in the measurement data and corresponding to the plurality of sample directions onto a space of the design model, determine a transform of the at least one design element to match the at least one design element with the plurality of measured points mapped onto the space of the design model, and output information about the determined transform as the verification result.

* * * * *